US008809767B2

(12) United States Patent
Bateman et al.

(10) Patent No.: US 8,809,767 B2
(45) Date of Patent: Aug. 19, 2014

(54) TIME OF FLIGHT MASS SPECTROMETER WITH ANALOG TO DIGITAL CONVERTER AND METHOD OF USING

(75) Inventors: Robert Harold Bateman, Cheshire (GB); Jeffery Mark Brown, Cheshire (GB); Martin Green, Cheshire (GB); Jason Lee Wildgoose, Stockport (GB); Anthony James Gilbert, High Peak (GB); Steven Derek Pringle, Darwen (GB)

(73) Assignee: Micromass UK Limited, Wilmslow (GB)

( * ) Notice: Subject to any disclaimer, the term of this patent is extended or adjusted under 35 U.S.C. 154(b) by 1171 days.

(21) Appl. No.: 12/302,168

(22) PCT Filed: Jun. 1, 2007

(86) PCT No.: PCT/GB2007/002043
§ 371 (c)(1),
(2), (4) Date: Sep. 2, 2009

(87) PCT Pub. No.: WO2007/138337
PCT Pub. Date: Dec. 6, 2007

(65) Prior Publication Data
US 2010/0001180 A1    Jan. 7, 2010

Related U.S. Application Data
(60) Provisional application No. 60/813,513, filed on Jun. 14, 2006.

(30) Foreign Application Priority Data
Jun. 1, 2006  (GB) .................................. 0610752.8

(51) Int. Cl.
*H01J 49/26* (2006.01)
*H01J 49/00* (2006.01)
*G06K 9/00* (2006.01)

(52) U.S. Cl.
CPC ........... *H01J 49/0036* (2013.01); *G06K 9/0053* (2013.01)
USPC .......................................... 250/281; 250/282

(58) Field of Classification Search
USPC ............................ 250/281, 282, 287; 702/180
See application file for complete search history.

(56) References Cited

U.S. PATENT DOCUMENTS

| 5,121,443 A    | 6/1992 | Tomlinson |
| 5,233,545 A *  | 8/1993 | Ho et al. ........................ 702/180 |
| 6,444,979 B1 * | 9/2002 | Watanabe ....................... 250/282 |

(Continued)

FOREIGN PATENT DOCUMENTS

| GB | 2406211 | 3/2005 |
| GB | 2429110 | 2/2007 |

(Continued)

*Primary Examiner* — Phillip A Johnston
*Assistant Examiner* — Brooke Purinton
(74) *Attorney, Agent, or Firm* — Diederiks & Whitelaw, PLC

(57) ABSTRACT

A Time of Flight mass analyser is disclosed comprising an ion detector comprising an Analogue to Digital Converter. Output signals from the ion detector are digitised and the arrival times and intensity values relating to ion arrival events are determined. If the determined arrival times from two signals fall within the same time window then the arrival times are added together in a weighted manner and the intensity values are combined.

24 Claims, 7 Drawing Sheets

(56) References Cited

U.S. PATENT DOCUMENTS

| | | | |
|---|---|---|---|
| 6,449,584 B1 * | 9/2002 | Bertrand et al. | 702/180 |
| 6,852,972 B2 * | 2/2005 | Baba et al. | 250/288 |
| 7,391,017 B2 * | 6/2008 | Kostrzewa et al. | 250/288 |
| 7,702,699 B2 * | 4/2010 | Vazquez et al. | 702/180 |
| 7,860,685 B2 * | 12/2010 | Ho et al. | 702/189 |
| 8,063,358 B2 * | 11/2011 | Bateman et al. | 250/282 |
| 8,658,971 B2 * | 2/2014 | Green et al. | 250/287 |
| 2003/0218129 A1 | 11/2003 | Rather | |
| 2004/0169137 A1 * | 9/2004 | Westphall et al. | 250/281 |
| 2005/0061968 A1 * | 3/2005 | Green | 250/288 |
| 2005/0255606 A1 * | 11/2005 | Ahmed et al. | 436/173 |
| 2005/0288872 A1 * | 12/2005 | Old et al. | 702/30 |
| 2006/0045207 A1 | 3/2006 | Cheng et al. | |
| 2006/0163469 A1 * | 7/2006 | Vestal | 250/287 |
| 2007/0143033 A1 * | 6/2007 | Zhang et al. | 702/26 |
| 2008/0035842 A1 * | 2/2008 | Sudakov et al. | 250/287 |

FOREIGN PATENT DOCUMENTS

| | | |
|---|---|---|
| JP | 9106779 | 4/1997 |
| JP | 2001249112 | 9/2001 |
| JP | 2002343300 | 11/2002 |
| JP | 2005268152 | 9/2005 |
| WO | 03006949 | 1/2003 |
| WO | 2006116335 | 11/2006 |

* cited by examiner

TIME OF FLIGHT MASS SPECTROMETER WITH ANALOG TO DIGITAL CONVERTER AND METHOD OF USING

CROSS REFERENCE TO RELATED APPLICATIONS

This application is the U.S. National Stage of International Application No. PCT/GB2007/002043, filed Jun. 1, 2007 and designating the United States, which claims benefit of and priority to U.S. Provisional Patent Application No. 60/813,513, filed Jun. 14, 2006, and United Kingdom Patent Application No. 0610752.8, filed Jun. 1, 2006, the entire contents of which are incorporated herein by reference.

BACKGROUND OF THE INVENTION

The present invention relates to a mass spectrometer and a method of mass spectrometry.

A known method of obtaining a mass spectrum is to record the output signal from an ion detector of a mass analyser as a function of time using a fast Analogue to Digital Converter (ADC). It is known to use an Analogue to Digital Converter with a scanning magnetic sector mass analyser, a scanning quadrupole mass analyser or an ion trap mass analyser.

If a mass analyser is scanned very quickly for a relatively long period of time (e.g. over the duration of a chromatography separation experimental run) then it is apparent that very large amounts of mass spectral data will be acquired if an Analogue to Digital Converter is used. Storing and processing a large amount of mass spectral data requires a large memory which is disadvantageous. Furthermore, the large amount of data has the effect of slowing subsequent processing of the data. This can be particularly problematic for real time applications such as Data Dependent Acquisitions (DDA).

Due to the problems of using an Analogue to Digital Converter with a Time of Flight mass analyser it is common, instead, to use a Time to Digital Converter (TDC) detector system with a Time of Flight mass analyser. A Time to Digital Converter differs from an Analogue to Digital Converter in that a Time to Digital Converter records just the time that an ion is recorded as arriving at the ion detector. As a result, Time to Digital Converters produce substantially less mass spectral data which makes subsequent processing of the data substantially easier. However, one disadvantage of Time to Digital Converters is that they do not output an intensity value associated with an ion arrival event. Time to Digital Converters are, therefore, unable to discriminate between one or multiple ions arriving at the ion detector at substantially the same time.

Conventional Time of Flight mass analysers sum the ion arrival times as determined by a Time to Digital Converter system from multiple acquisitions. No data is recorded at times when no ions arrive at the ion detector. A composite histogram of the times of recorded ion arrival events is then formed. As more and more ions are added to the histogram from subsequent acquisitions, the histogram progressively builds up to form a mass spectrum of ion counts versus flight time (or mass to charge ratio).

Conventional Time of Flight mass analysers may collect, sum or histogram many hundreds or even thousands of separate time of flight spectra obtained from separate acquisitions in order to produce a final composite mass spectrum. The mass spectrum or histogram of ion arrival events may then be stored to computer memory.

One disadvantage of conventional Time of Flight mass analysers is that many of the individual spectra which are histogrammed to produce a final mass spectrum may relate to acquisitions wherein only a few or no ion arrival events were recorded. This is particularly the case for orthogonal acceleration Time of Flight mass analysers operated at very high acquisition rates.

Known Time of Flight mass analysers comprise an ion detector comprising a secondary electron multiplier such as a microchannel plate (MCP) or discrete dynode electron multiplier. The secondary electron multiplier or discrete dynode electron multiplier generates a pulse of electrons in response to an ion arriving at the ion detector. The pulse of electrons or current pulse is then converted into a voltage pulse which may then be amplified using an appropriate amplifier.

State of the art microchannel plate ion detectors can produce a signal in response to the arrival of a single ion wherein the signal has a Full Width at Half Maximum of between 1 and 3 ns. A Time to Digital Converter (TDC) is used to detect the ion signal. If the signal produced by the electron multiplier exceeds a predefined voltage threshold then the signal may be recorded as relating to an ion arrival event. The ion arrival event is recorded just as a time value with no associated intensity information. The arrival time is recorded as corresponding to the time when the leading edge of the ion signal passes through the voltage threshold. The recorded arrival time will only be accurate to the nearest clock step of the Time to Digital Converter. A state of the art 10 GHz Time to Digital Converter is capable of recording ion arrival times to within ±50 ps.

One advantage of using a Time to Digital Converter to record ion arrival events is that any electronic noise can be effectively removed by applying a signal or voltage threshold. As a result, the noise does not appear in the final histogrammed mass spectrum and a very good signal to noise ratio can be achieved if the ion flux is relatively low.

Another advantage of using a Time to Digital Converter is that the analogue width of the signal generated by a single ion does not add to the width of the ion arrival envelope for a particular mass to charge ratio value in the final histogrammed mass spectrum. Since only ion arrival times are recorded the width of mass peaks in the final histogrammed mass spectrum is determined only by the spread in ion arrival times for each mass peak and by the variation in the voltage pulse height produced by an ion arrival event relative to the signal threshold.

However, an important disadvantage of conventional Time of Flight mass analysers comprising an ion detector including a Time to Digital Converter detector is that the Time to Digital Converter detector is unable to distinguish between a signal arising due to the arrival of a single ion at the ion detector and that of a signal arising due to the simultaneous arrival of multiple ions at the ion detector. This inability to distinguish between single and multiple ion arrival events leads to a distortion of the intensity of the final histogram or mass spectrum. Furthermore, an ion arrival event will only be recorded if the output signal from the ion detector exceeds a predefined voltage threshold.

Known ion detectors which incorporate a Time to Digital Converter system also suffer from the problem that they exhibit a recovery time after an ion arrival event has been recorded during which time the signal must fall below the predetermined voltage signal threshold. During this dead time no further ion arrival events can be recorded.

At relatively high ion fluxes the probability of several ions arriving at the ion detector at substantially the same time during an acquisition can become relatively significant. As a result, dead time effects will lead to a distortion in the intensity and mass to charge ratio position in the final histogrammed mass spectrum. Known mass analysers which use a Time to Digital Converter detector system therefore suffer from the problem of having a relatively limited dynamic range for both quantitative and qualitative applications.

In contrast to the limitations of a Time to Digital Converter system, multiple ion arrival events can be accurately recorded using an Analogue to Digital Converter system. An Analogue to Digital Converter system can record the signal intensity at each clock cycle.

Known Analogue to Digital recorders can digitise a signal at a rate, for example, of 2 GHz whilst recording the intensity of the signal as a digital value of up to eight bits. This corresponds to an intensity value of 0-255 at each time digitisation point. Analogue to Digital Converters are also known which can record a digital intensity value at up to 10 bits, but such Analogue to Digital Converters tend to have a limited spectral repetition rate.

An Analogue to Digital Converter produces a continuum intensity profile as a function of time corresponding to the signal output from the electron multiplier. Time of flight spectra from multiple acquisitions can then be summed together to produce a final mass spectrum.

An advantageous feature of an Analogue to Digital Converter system is that an Analogue to Digital Converter system can output an intensity value and can therefore record multiple simultaneous ion arrival events by outputting an increased intensity value. In contrast, a Time to Digital Converter system is unable to discriminate between one or multiple ions arriving at the ion detector at substantially the same time.

Analogue to Digital Converters do not suffer from dead time effects which may be associated with a Time to Digital Converter which uses a detection threshold. However, Analogue to Digital Converters suffer from the problem that the analogue width of the signal from individual ion arrivals adds to the width of the ion arrival envelope. Accordingly, the mass resolution of the final summed or histogrammed mass spectrum may be reduced compared to a comparable mass spectrum produced using a Time to Digital Converter based system.

Analogue to Digital Converters also suffer from the problem that any electronic noise will also be digitised and will appear in each time of flight spectrum corresponding to each acquisition. This noise will then be summed and will be present in the final or histogrammed mass spectrum. As a result; relatively weak ion signals can be masked and this can lead to relatively poor detection limits compared to those obtainable using a Time to Digital Converter based system.

It is desired to provide an improved mass spectrometer and method of mass spectrometry.

SUMMARY OF THE INVENTION

According to an aspect of the present invention there is provided a method of mass spectrometry comprising:

digitising a first signal output from an ion detector to produce a first digitised signal;

determining or obtaining a second differential or second difference of the first digitised signal;

determining the arrival time $T_1$ of one or more first ions from the second differential or second difference of the first digitised signal;

determining the intensity $I_1$ of the one or more first ions;

digitising a second signal output from the ion detector to produce a second digitised signal;

determining or obtaining a second differential or second difference of the second digitised signal;

determining the arrival time $T_2$ of one or more second ions from the second differential or second difference of the second digitised signal;

determining the intensity $I_2$ of the one or more second ions; and determining whether the determined arrival time $T_2$ of the one or more second ions falls within a time period, time window or memory array element within which the determined arrival time $T_1$ of the one or more first ions falls, wherein if it is determined that the determined arrival time $T_2$ of the one or more second ions falls within the time period, time window or memory array element within which the determined arrival time $T_1$ of the one or more first ions falls then the method further comprises: (i) determining an average arrival time T' of the one or more first ions $T_1$ and the one or more second ions $T_2$; and/or (ii) determining the combined intensity I' of the one or more first ions $I_1$ and the one or more second ions $I_2$.

The steps of determining or obtaining a second differential of the first digitised signal and/or the second digitised signal are highly preferred but not essential to the present invention.

The first and/or second signal preferably comprises an output signal, a voltage signal, an ion signal, an ion current, a voltage pulse or an electron current pulse.

According to the preferred embodiment the average arrival time T' follows the relationship:

$$T' = \frac{T_1 I_1 + T_2 I_2}{I_1 + I_2}$$

The combined intensity I' preferably follows the relationship:

$$I' = I_1 + I_2$$

The method preferably further comprises replacing the determined arrival time $T_1$ and the determined intensity $I_1$ of the one or more first ions and replacing the determined arrival time $T_2$ and the determined intensity $I_2$ of the one or more second ions with the average arrival time T' and the combined intensity I'.

The time period, time window or memory array element preferably has a width, wherein the width preferably falls within a range selected from the group consisting of: (i) <1 ps; (ii) 1-10 ps; (iii) 10-100 ps; (iv) 100-200 ps; (v) 200-300 ps; (vi) 300-400 ps; (vii) 400-500 ps; (viii) 500-600 ps; (ix) 600-700 ps; (x) 700-800 ps; (xi) 800-900 ps; (xii) 900-1000 ps; (xiii) 1-2 ns; (xiv) 2-3 ns; (xv) 3-4 ns; (xvi) 4-5 ns; (xvii) 5-6 ns; (xviii) 6-7 ns; (xix) 7-8 ns; (xx) 8-9 ns; (xxi) 9-10 ns; (xxii) 10-100 ns; (xxiii) 100-500 ns; (xxiv) 500-1000 ns; (xxv) 1-10 µs; (xxvi) 10-100 µs; (xxvii) 100-500 µs; (xxviii) >500 µs.

The method preferably further comprises obtaining the first signal and/or the second signal over an acquisition time period, wherein the length of the acquisition time period is preferably selected from the group consisting of: (i) <1 µs; (ii) 1-10 µs; (iii) 10-20 µs; (iv) 20-30 µs; (v) 30-40 µs; (vi) 40-50 µs; (vii) 50-60 µs; (viii) 60-70 µs; (ix) 70-80 µs; (x) 80-90 µs; (xi) 90-100 µs; (xii) 100-110 µs; (xiii) 110-120 µs; (xiv) 120-130 µs; (xv) 130-140 µs; (xvi) 140-150 µs; (xvii) 150-160 µs; (xviii) 160-170 µs; (xix) 170-180 µs; (xx) 180-190 µus; (xxi) 190-200 µs; (xxii) 200-250 µs; (xxiii) 250-300 µs; (xxiv) 300-350 µs; (xxv) 350-400 µs; (xxvi) 450-500 µs; (xxvii) 500-1000 µs; and (xxviii) >1 ms.

The method preferably further comprises sub-dividing the acquisition time period into n time periods, time windows or memory array elements, wherein n is preferably selected from the group consisting of: (i) <100; (ii) 100-1000; (iii) 1000-10000; (iv) 10,000-100,000; (v) 100,000-200,000; (vi) 200,000-300,000; (vii) 300,000-400,000; (viii) 400,000-500,000; (ix) 500,000-600,000; (x) 600,000-700,000; (xi) 700,000-800,000; (xii) 800,000-900,000; (xiii) 900,000-1,000,000; and (xiv) >1,000,000.

Each time period, time window or memory array element preferably has substantially the same length, width or duration.

The method preferably further comprises using an Analogue to Digital Converter or a transient recorder to digitise the first signal and/or the second signal. The Analogue to Digital Converter or transient recorder preferably comprises a n-bit Analogue to Digital Converter or transient recorder, wherein n preferably comprises 8, 10, 12, 14 or 16.

The Analogue to Digital Converter or transient recorder preferably has a sampling or acquisition rate selected from the group consisting of: (i) <1 GHz; (ii) 1-2 GHz; (iii) 2-3 GHz; (iv) 3-4 GHz; (v) 4-5 GHz; (vi) 5-6 GHz; (vii) 6-7 GHz; (viii) 7-8 GHz; (ix) 8-9 GHz; (x) 9-10 GHz; and (xi) >10 GHz.

According to an embodiment the Analogue to Digital Converter or transient recorder has a digitisation rate which is substantially uniform. According to an alternative embodiment the Analogue to Digital Converter or transient recorder may have a digitisation rate which is substantially non-uniform.

The method preferably further comprises subtracting a constant number or value from the first digitised signal and/or the second digitised signal. If a portion of the first digitised signal falls below zero after subtraction of a constant number or value from the first digitised signal then the method preferably further comprises resetting the portion of the first digitised signal to zero.

If a portion of the second digitised signal falls below zero after subtraction of a constant number or value from the second digitised signal then the method preferably further comprises resetting the portion of the second digitised signal to zero.

According to the preferred embodiment the method further comprises smoothing the first digitised signal and/or the second digitised signal. According to an embodiment a moving average, boxcar integrator, Savitsky Golay or Hites Biemann algorithm may be used to smooth the first digitised signal and/or the second digitised signal.

The step of determining the arrival time $T_1$ of one or more first ions from the second differential of the first digitised signal preferably comprises determining one or more zero crossing points of the second differential of the first digitised signal.

The method preferably further comprises determining or setting a start time $T_{1start}$ of an ion arrival event as corresponding to a digitisation interval which is immediately prior or subsequent to the time when the second differential of the first digitised signal falls below zero or another value.

The method preferably further comprises determining or setting an end time $T_{1end}$ of an ion arrival event as corresponding to a digitisation interval which is immediately prior or subsequent to the time when the second differential of the first digitised signal rises above zero or another value.

According to an embodiment the method further comprises determining the intensity of one or more peaks present in the first digitised signal which correspond to one or more ion arrival events. The step of determining the intensity of one or more peaks present in the first digitised signal preferably comprises determining the area of one or more peaks present in the first digitised signal bounded by the start time $T_{1start}$ and/or by the end time $T_{1end}$.

According to an embodiment the method further comprises determining the moment of one or more peaks present in the first digitised signal which correspond to one or more ion arrival events. The step of determining the moment of one or more peaks present in the first digitised signal which correspond to one or more ion arrival events preferably comprises determining the moment of a peak bounded by the start time $T_{1start}$ and/or by the end time $T_{1end}$.

The method preferably further comprises determining the centroid time of one or more peaks present in the first digitised signal which correspond to one or more ion arrival events.

According to an embodiment the method further comprises determining the average or representative time of one or more peaks present in the first digitised signal which correspond to, one or more ion arrival events.

The step of determining the arrival time $T_2$ of one or more second ions from the second differential of the second digitised signal preferably comprises determining one or more zero crossing points of the second differential of the second digitised signal.

According to an embodiment the method further comprises determining or setting a start time $T_{2start}$ of an ion arrival event as corresponding to a digitisation interval which is immediately prior or subsequent to the time when the second differential of the second digitised signal falls below zero or another value.

The method preferably further comprises determining or setting an end time $T_{2end}$ of an ion arrival event as corresponding to a digitisation interval which is immediately prior or subsequent to the time when the second differential of the second digitised signal rises above zero or another value.

The method preferably further comprises determining the intensity of one or more peaks present in the second digitised signal which correspond to one or more ion arrival events. The step of determining the intensity of one or more peaks present in the second digitised signal preferably comprises determining the area of one or more peaks present in the second digitised signal bounded by the start time $T_{2start}$ and/or by the end time $T_{2end}$.

According to the preferred embodiment the method further comprises determining the moment of one or more peaks present in the second digitised signal which correspond to one or more ion arrival events. The step of determining the moment of one or more peaks present in the second digitised signal which correspond to one or more ion arrival events preferably comprises determining the moment of a peak bounded by the start time $T_{2start}$ and/or by the end time $T_{2end}$.

The method preferably further comprises determining the centroid time of one or more peaks present in the second digitised signal which correspond to one or more ion arrival events.

According to an embodiment the method preferably further comprises determining the average or representative time of one or more peaks present in the second digitised signal which correspond to one or more ion arrival events.

According to an embodiment the method preferably further comprises:

digitising one or more further signals output from the ion detector to produce one or more further digitised signals;

determining or obtaining a second differential or second difference of the one or more further digitised signals;

determining the arrival time $T_n$ of one or more further ions from the second differential or second difference of the one or more further digitised signals; and determining the intensity $I_n$ of the one or more further ions.

The method preferably further comprises determining whether the determined arrival time $T_n$ of the one or more further ions falls within a time period, time window or memory array element within which the determined arrival time $T_0$ of one or more other ions falls, wherein if it is determined that the determined arrival time $T_n$ of the one or more further ions falls within the time period, time window or memory array element within which the determined arrival time $T_0$ of the one or more other ions falls then the method further comprises: (i) determining an average arrival time $T_n'$ of the one or more further ions $T_n$ and the one or more other ions $T_0$; and/or (ii) determining the combined intensity $I_n'$ of the one or more further ions $I_n$ and the one or more other ions $I_0$.

The average arrival time $T_n'$ preferably follows the relationship:

$$T_n' = \frac{T_n I_n + T_0 I_0}{I_n + I_0}$$

The combined intensity $I_n'$ preferably follows the relationship:

$$I_n' = I_n + I_0$$

The method preferably further comprises replacing the determined arrival time $T_n$ and the determined intensity $I_n$ of the one or more further ions and replacing the determined arrival time $T_0$ and the determined intensity $I_0$ of the one or more other ions with the average arrival time $T_n'$ and the combined intensity $I_n'$.

According to an embodiment the step of digitising one or more further signals preferably comprises digitising at least 5, 10, 15, 20, 25, 30, 35, 40, 45, 50 55, 60, 65, 70, 75, 80, 85, 90, 95, 100, 200, 300, 400, 500, 600, 700, 800, 900, 1000, 2000, 3000, 4000, 5000, 6000, 7000, 8000, 9000 or 10000 signals from the ion detector. Each signal preferably corresponds to a separate experimental run or acquisition.

The method preferably further comprises storing the determined times or average times and/or intensities of one or more peaks present in the digitised signals which correspond to one or more ion arrival events.

According to an embodiment the method preferably further comprises subtracting a constant number or value from at least some or each the one or more further digitised signals. If a portion of at least some or each the one or more further digitised signals falls below zero after subtraction of a constant number or value from the one or more further digitised signals then the method preferably further comprises resetting the portion of the one or more further digitised signals to zero.

According to an embodiment the method preferably further comprises smoothing the one or more further digitised signals. A moving average, boxcar integrator, Savitsky Golay or Hites Biemann algorithm may be used to smooth the one or more further digitised signals.

The step of determining the arrival time of the one or more further ions from the second differential of each the one or more further digitised signals preferably comprises determining one or more zero crossing points of each the second differential of the one or more further digitised signals. The method preferably further comprises determining or setting a start time $T_{nstart}$ of an ion arrival event as corresponding to a digitisation interval which is immediately prior or subsequent to the time when the second differential of one or more further digitised signals falls below zero or another value.

According to an embodiment the method preferably further comprises determining or setting an end time $T_{nend}$ of an ion arrival event as corresponding to a digitisation interval which is immediately prior or subsequent to the time when the second differential of the one or more further digitised signals rises above zero or another value.

The step of determining the intensity of the one or more further digitised signals relating to an ion arrival event preferably comprises determining the area of an output signal peak, a voltage signal peak, an ion signal peak, an ion current peak or a voltage pulse bounded by the start time $T_{nstart}$ and/or the end time $T_{nend}$.

The method preferably further comprises determining the moment of the one or more further digitised signals relating to an ion arrival event. According to an embodiment the step of determining the moment of the one or more further digitised signals relating to an ion arrival event preferably comprises determining the moment of an output signal peak, a voltage signal peak, an ion signal peak, an ion current peak or a voltage pulse bounded by the start time $T_{nstart}$ and/or the end time $T_{nend}$.

The method preferably further comprises determining the centroid time of the one or more further digitised signals relating to an ion arrival event.

According to an embodiment the method preferably further comprises determining the average or representative time of the one or more further digitised signals relating to an ion arrival event.

The method preferably further comprises storing the average or representative time and/or intensity of the one or more further digitised signals relating to an ion arrival event.

According to an embodiment the method preferably further comprises combining data relating to the time and intensity of peaks relating to ion arrival events. A moving average integrator algorithm, boxcar integrator algorithm, Savitsky Golay algorithm or Hites Biemann algorithm may be used to combine data relating to the time and intensity of peaks relating to ion arrival events.

According to the preferred embodiment a continuum time or mass spectrum is preferably provided.

The method preferably further comprises determining or obtaining a second differential or second difference of the continuum time or mass spectrum. The method preferably further comprises determining the arrival time or mass or mass to charge ratio of one or more ions, peaks or mass peaks from the second differential or second difference of the continuum time or mass spectrum.

The step of determining the arrival time or mass or mass to charge ratio of one or more ions, peaks or mass peaks from the second differential of the continuum time or mass spectrum preferably comprises determining one or more zero crossing points of the second differential of the continuum time or mass spectrum.

The method preferably further comprises determining or setting a start point $M_{start}$ of a peak or mass peak as corresponding to a stepping interval which is immediately prior or subsequent to the point when the second differential of the continuum time or mass spectrum falls below zero or another value.

The method preferably further comprises determining or setting an end point $M_{end}$ of a peak or mass peak as corresponding to a stepping interval which is immediately prior or subsequent to the point when the second differential of the continuum time or mass spectrum rises above zero or another value.

According to the preferred embodiment the method further comprises determining the intensity of peaks or mass peaks from the continuum time or mass spectrum. The step of determining the intensity of peaks or mass peaks from the continuum time or mass spectrum preferably comprises determining the area of a peak or mass peak bounded by the start point $M_{start}$ and/or the end point $M_{end}$.

The method preferably further comprises determining the moment of peaks or mass peaks from the continuum time or mass spectrum. The step of determining the moment of peaks or mass peaks from the continuum time or mass spectrum preferably comprises determining the moment of a peak or mass peak bounded by the start point $M_{start}$ and/or the end point $M_{end}$.

The method preferably further comprises determining the centroid time or mass of peaks or mass peaks from the continuum time or mass spectrum.

According to the preferred embodiment the method further comprises determining the average or representative time or mass of peaks or mass peaks from the continuum time or mass spectrum.

The method preferably further comprises converting time data into mass or mass to charge ratio data.

The method preferably further comprises displaying or outputting a mass spectrum. The mass spectrum preferably comprises a plurality of mass spectral data points wherein each data point is considered as representing a species of ion and wherein each data point comprises an intensity value and a mass or mass to charge ratio value.

According to a preferred embodiment the ion detector comprises a microchannel plate, a photomultiplier or an electron multiplier device.

The ion detector preferably further comprises a current to voltage converter or amplifier for producing a voltage pulse in response to the arrival of one or more ions at the ion detector.

The method preferably further comprises providing a mass analyser. The mass analyser preferably comprises: (i) a Time of Flight ("TOF") mass analyser; (ii) an orthogonal acceleration Time of Flight ("oaTOF") mass analyser; or (iii) an axial acceleration Time of Flight mass analyser. Alternatively, the mass analyser may be selected from the group consisting of: (i) a magnetic sector mass spectrometer; (ii) a Paul or 3D quadrupole mass analyser; (iii) a 2D or linear quadrupole mass analyser; (iv) a Penning trap mass analyser; (v) an ion trap mass analyser; and (vi) a quadrupole mass analyser.

According to another aspect of the present invention there is provided apparatus comprising:

means arranged to digitise a first signal output from an ion detector to produce a first digitised signal;

means arranged to determine or obtain a second differential or second difference of the first digitised signal;

means arranged to determine the arrival time $T_1$ of one or more first ions from the second differential or second difference of the first digitised signal;

means arranged to determine the intensity $I_1$ of the one or more first ions;

means arranged to digitise a second signal output from the ion detector to produce a second digitised signal;

means arranged to determine or obtain a second differential or second difference of the second digitised signal;

means arranged to determine the arrival time $T_2$ of one or more second ions from the second differential or second difference of the second digitised signal;

means arranged to determine the intensity $I_2$ of the one or more second ions; and means arranged to determine whether the determined arrival time $T_2$ of the one or more second ions falls within a time period, time window or memory array element within which the determined arrival time $T_1$ of the one or more first ions falls, wherein if it is determined that the determined arrival time $T_2$ of the one or more second ions falls within the time period, time window or memory array element within which the determined arrival time $T_1$ of the one or more first ions falls then the apparatus further: (i) determines an average arrival time T' of the one or more first ions $T_1$ and the one or more second ions $T_2$; and/or (ii) determines the combined intensity I' of the one or more first ions $I_1$ and the one or more second ions $I_2$. Determining or obtaining a second differential of the first digitised signal and/or the second digitised signal is highly preferred but not essential to the present invention.

The average arrival time T' preferably follows the relationship:

$$T' = \frac{T_1 I_1 + T_2 I_2}{I_1 + I_2}$$

The combined intensity I' preferably follows the relationship:

$$I' = I_1 + I_2$$

The apparatus preferably further comprises means arranged to replace the determined arrival time $T_1$ and the determined intensity $I_1$ of the one or more first ions and to replace the determined arrival time $T_2$ and the determined intensity $I_2$ of the one or more second ions with the average arrival time T' and the combined intensity I'.

The apparatus preferably further comprises an Analogue to Digital Converter or a transient recorder to digitise the first signal and/or the second signal. The Analogue to Digital Converter or transient recorder preferably comprises a n-bit Analogue to Digital Converter or transient recorder, wherein n comprises 8, 10, 12, 14 or 16.

The Analogue to Digital Converter or transient recorder preferably has a sampling or acquisition rate selected from the group consisting of: (i) <1 GHz; (ii) 1-2 GHz; (iii) 2-3 GHz; (iv) 3-4 GHz; (v) 4-5 GHz; (vi) 5-6 GHz; (vii) 6-7 GHz; (viii) 7-8 GHz; (ix) 8-9 GHz; (x) 9-10 GHz; and (xi) >10 GHz.

The Analogue to Digital Converter or transient recorder preferably has a digitisation rate which is substantially uniform. The Analogue to Digital Converter or transient recorder may, alternatively, have a digitisation rate which is substantially non-uniform.

According to another aspect of the present invention there is provided a mass spectrometer comprising apparatus as discussed above.

According to an embodiment the mass spectrometer further comprises an ion source. The ion source is preferably selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; and (xviii) a Thermospray ion source.

The mass spectrometer may comprise a continuous or a pulsed ion source.

The mass spectrometer preferably further comprises a mass analyser. The mass analyser preferably comprises: (i) a Time of Flight ("TOF") mass analyser; (ii) an orthogonal acceleration Time of Flight ("oaTOF") mass analyser; or (iii) an axial acceleration Time of Flight mass analyser. Alternatively, the mass analyser may be selected from the group consisting of: (i) a magnetic sector mass spectrometer; (ii) a Paul or 3D quadrupole mass analyser; (iii) a 2D or linear quadrupole mass analyser; (iv) a Penning trap mass analyser; (v) an ion trap mass analyser; and (vi) a quadrupole mass analyser.

The mass spectrometer preferably further comprises a collision, fragmentation or reaction device. The collision, fragmentation or reaction device is preferably arranged to fragment ions by Collisional Induced Dissociation ("CID"). Alternatively, the collision, fragmentation or reaction device may be selected from the group consisting of: (i) a Surface Induced Dissociation ("SID") fragmentation device; (ii) an Electron Transfer Dissociation fragmentation device; (iii) an Electron Capture Dissociation fragmentation device; (iv) an Electron Collision or Impact Dissociation fragmentation device; (v) a Photo Induced Dissociation ("PID") fragmentation device; (vi) a Laser Induced Dissociation fragmentation device; (vii) an infrared radiation induced dissociation device; (viii) an ultraviolet radiation induced dissociation device; (ix) a nozzle-skimmer interface fragmentation device; (x) an in-source fragmentation device; (xi) an ion-source Collision Induced Dissociation fragmentation device; (xii) a thermal or temperature source fragmentation device; (xiii) an electric field induced fragmentation device; (xiv) a magnetic field induced fragmentation device; (xv) an enzyme digestion or enzyme degradation fragmentation device; (xvi) an ion-ion reaction fragmentation device; (xvii) an ion-molecule reaction fragmentation device; (xviii) an ion-atom reaction fragmentation device; (xix) an ion-metastable ion reaction fragmentation device; (xx) an ion-metastable molecule reaction fragmentation device; (xxi) an ion-metastable atom reaction fragmentation device; (xxii) an ion-ion reaction device for reacting ions to form adduct or product ions; (xxiii) an ion-molecule reaction device for reacting ions to form adduct or product ions; (xxiv) an ion-atom reaction device for reacting ions to form adduct or product ions; (xxv) an ion-metastable ion reaction device for reacting ions to form adduct or product ions; (xxvi) an ion-metastable molecule reaction device for reacting ions to form adduct or product ions; and (xxvii) an ion-metastable atom reaction device for reacting ions to form adduct or product ions.

According to another aspect of the present invention there is provided a method of mass spectrometry comprising:

digitising a first signal output from an ion detector;

determining or obtaining a second differential or second difference of the first digitised signal;

determining the mass or mass to charge ratio $m_1$ of one or more first ions from the second differential or second difference of the first digitised signal;

determining the intensity $I_1$ of the one or more first ions;

digitising a second signal output from the ion detector;

determining or obtaining a second differential or second difference of the second digitised signal;

determining the mass or mass to charge ratio $m_2$ of one or more second ions from the second differential or second difference of the second digitised signal;

determining the intensity $I_2$ of the one or more second ions; and determining whether the determined mass or mass to charge ratio $m_2$ of the one or more second ions falls within a mass window or pre-determined memory location within which the determined mass or mass to charge ratio $m_1$ of the one or more first ions falls, wherein if it is determined that the determined mass or mass to charge ratio $m_2$ of the one or more second ions falls within a mass window or pre-determined memory location within which the determined mass or mass to charge ratio $m_1$ of the one or more first ions falls then the method further comprises: (i) determining an average mass or mass to charge ratio m' of the one or more first ions $m_1$ and the one or more second ions $m_2$; and/or (ii) determining the combined intensity I' of the one or more first ions $I_1$ and the one or more second ions $I_2$. The steps of determining or obtaining a second differential of the first digitised signal and/or the second digitised signal are highly preferred but not essential to the present invention.

The average mass or mass to charge ratio m' preferably follows the relationship:

$$m' = \frac{m_1 I_1 + m_2 I_2}{I_1 + I_2}$$

The combined intensity I' preferably follows the relationship:

$$I' = I_1 + I_2$$

The method preferably further comprises replacing the determined mass or mass to charge ratio $m_1$ and the determined intensity $I_1$ of the one or more first ions and replacing the determined mass or mass to charge ratio $m_2$ and the determined intensity $I_2$ of the one or more second ions with the average mass or mass to charge ratio $m_1$ and the combined intensity I'.

According to another aspect of the present invention there is provided apparatus comprising:

means arranged to digitise a first signal output from an ion detector;

means arranged to determine or obtain a second differential or second difference of the first digitised signal;

means arranged to determine the mass or mass to charge ratio $m_1$ of one or more first ions from the second differential or second difference of the first digitised signal;

means arranged to determine the intensity $I_1$ of the one or more first ions;

means arranged to digitise a second signal output from the ion detector;

means arranged to determine or obtain a second differential or second difference of the second digitised signal;

means arranged to determine the mass or mass to charge ratio $m_2$ of one or more second ions from the second differential or second difference of the second digitised signal;

means arranged to determine the intensity $I_2$ of the one or more second ions; and means arranged to determine whether the determined mass or mass to charge ratio $m_2$ of the one or more second ions falls within a mass window or pre-determined memory location within which the determined mass or mass to charge ratio $m_1$ of the one or more first ions falls, wherein if it is determined that the determined mass or mass to charge ratio $m_2$ of the one or more second ions falls within a mass window or pre-determined memory location within which the determined mass or mass to charge ratio $m_1$ of the one or more first ions falls then the apparatus further: (i) determines an average mass or mass to charge ratio m' of the one or more first ions $m_1$ and the one or more second ions $m_2$; and/or (ii) determines the combined intensity I' of the one or more first ions $I_1$ and the one or more second ions $I_2$.

Determining or obtaining a second differential of the first digitised signal and/or the second digitised signal is highly preferred but not essential to the present invention.

The average mass or mass to charge ratio m' preferably follows the relationship:

$$m' = \frac{m_1 I_1 + m_2 I_2}{I_1 + I_2}$$

The combined intensity I' preferably follows the relationship:

I'=$I_1$+$I_2$

The apparatus preferably further comprises means arranged to replace the determined mass or mass to charge ratio $m_1$ and the determined intensity $I_1$ of the one or more first ions and to replace the determined mass or mass to charge ratio $m_2$ and the determined intensity $I_2$ of the one or more second ions with the average mass or mass to charge ratio m' and the combined intensity I'.

The apparatus preferably further comprises an Analogue to Digital Converter or a transient recorder to digitise the first signal and/or the second signal. The Analogue to Digital Converter or transient recorder preferably comprises a n-bit Analogue to Digital Converter or transient recorder, wherein n comprises 8, 10, 12, 14 or 16. The Analogue to Digital Converter or transient recorder preferably has a sampling or acquisition rate selected from the group consisting of: (i) <1 GHz; (ii) 1-2 GHz; (iii) 2-3 GHz; (iv) 3-4 GHz; (v) 4-5 GHz; (vi) 5-6 GHz; (vii) 6-7 GHz; (viii) 7-8 GHz; (ix) 8-9 GHz; (x) 9-10 GHz; and (xi) >10 GHz.

The Analogue to Digital Converter or transient recorder preferably has a digitisation rate which is substantially uniform. Alternatively, the Analogue to Digital Converter or transient recorder may have a digitisation rate which is substantially non-uniform.

According to another aspect of the present invention there is provided a mass spectrometer comprising apparatus as discussed above.

The mass spectrometer preferably comprises an ion source. The ion source is preferably selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; and (xviii) a Thermospray ion source.

The mass spectrometer preferably comprises a continuous or a pulsed ion source.

The mass spectrometer preferably further comprises a mass analyser. The mass analyser preferably comprises: (i) a Time of Flight ("TOF") mass analyser; (ii) an orthogonal acceleration Time of Flight ("oaTOF") mass analyser; or (iii) an axial acceleration Time of Flight mass analyser. Alternatively, the mass analyser may be selected from the group consisting of: (i) a magnetic sector mass spectrometer; (ii) a Paul or 3D quadrupole mass analyser; (iii) a 2D or linear quadrupole mass analyser; (iv) a Penning trap mass analyser; (v) an ion trap mass analyser; and (vi) a quadrupole mass analyser.

According to an embodiment the mass spectrometer preferably further comprises a collision, fragmentation or reaction device. The collision, fragmentation or reaction device is preferably arranged to fragment ions by Collisional Induced Dissociation ("CID"). Alternatively, the collision, fragmentation or reaction device may be selected from the group consisting of: (i) a Surface Induced Dissociation ("SID") fragmentation device; (ii) an Electron Transfer Dissociation fragmentation device; (iii) an Electron Capture Dissociation fragmentation device; (iv) an Electron Collision or Impact Dissociation fragmentation device; (v) a Photo Induced Dissociation ("PID") fragmentation device; (vi) a Laser Induced Dissociation fragmentation device; (vii) an infrared radiation induced dissociation device; (viii) an ultraviolet radiation induced dissociation device; (ix) a nozzle-skimmer interface fragmentation device; (x) an in-source fragmentation device; (xi) an ion-source Collision Induced Dissociation fragmentation device; (xii) a thermal or temperature source fragmentation device; (xiii) an electric field induced fragmentation device; (xiv) a magnetic field induced fragmentation device; (xv) an enzyme digestion or enzyme degradation fragmentation device; (xvi) an ion-ion reaction fragmentation device; (xvii) an ion-molecule reaction fragmentation device; (xviii) an ion-atom reaction fragmentation device; (xix) an ion-metastable ion reaction fragmentation device; (xx) an ion-metastable molecule reaction fragmentation device; (xxi) an ion-metastable atom reaction fragmentation device; (xxii) an ion-ion reaction device for reacting ions to form adduct or product ions; (xxiii) an ion-molecule reaction device for reacting ions to form adduct or product ions; (xxiv) an ion-atom reaction device for reacting ions to form adduct or product ions; (xxv) an ion-metastable ion reaction device for reacting ions to form adduct or product ions; (xxvi) an ion-metastable molecule reaction device for reacting ions to form adduct or product ions; and (xxvii) an ion-metastable atom reaction device for reacting ions to form adduct or product ions.

According to another aspect of the present invention there is provided a method of mass spectrometry comprising:

digitising a first signal output from an ion detector to produce a first digitised signal;

determining the arrival time $T_1$ of one or more first ions;

determining the intensity $I_1$ of the one or more first ions;

digitising a second signal output from the ion detector to produce a second digitised signal;

determining the arrival time $T_2$ of one or more second ions;

determining the intensity $I_2$ of the one or more second ions; and determining whether the determined arrival time $T_2$ of the one or more second ions falls within a time period, time window or memory array element within which the determined arrival time $T_1$ of the one or more first ions falls, wherein if it is determined that the determined arrival time $T_2$ of the one or more second ions falls within the time period, time window or memory array element within which the determined arrival time $T_1$ of the one or more first ions falls then the method further comprises: (i) determining an average arrival time T' of the one or more first ions $T_1$ and the one or more second ions $T_2$; and/or (ii) determining the combined intensity I' of the one or more first ions $I_1$ and the one or more second ions $I_2$.

According to another aspect of the present invention there is provided apparatus comprising:

means arranged to digitise a first signal output from an ion detector to produce a first digitised signal;

means arranged to determine the arrival time $T_1$ of one or more first ions;

means arranged to determine the intensity $I_1$ of the one or more first ions;

means arranged to digitise a second signal output from the ion detector to produce a second digitised signal;

means arranged to determine the arrival time $T_2$ of one or more second ions;

means arranged to determine the intensity $I_2$ of the one or more second ions; and means arranged to determine whether the determined arrival time $T_2$ of the one or more second ions falls within a time period, time window or memory array element within which the determined arrival time $T_1$ of the one or more first ions falls, wherein if it is determined that the determined arrival time $T_2$ of the one or more second ions falls within the time period, time window or memory array element within which the determined arrival time $T_1$ of the one or more first ions falls then the apparatus further: (i) determines an average arrival time T' of the one or more first ions $T_1$ and the one or more second ions $T_2$; and/or (ii) determines the combined intensity. I' of the one or more first ions $I_1$ and the one or more second ions $I_2$.

According to another aspect of the present invention there is provided a method of mass spectrometry comprising:

digitising a first signal output from an ion detector;

determining the mass or mass to charge ratio $m_1$ of one or more first ions;

determining the intensity $I_1$ of the one or more first ions;

digitising a second signal output from the ion detector;

determining the mass or mass to charge ratio $m_2$ of one or more second ions;

determining the intensity $I_2$ of the one or more second ions; and determining whether the determined mass or mass to charge ratio $m_2$ of the one or more second ions falls within a mass window or pre-determined memory location within which the determined mass or mass to charge ratio $m_1$ of the one or more first ions falls, wherein if it is determined that the determined mass or mass to charge ratio $m_2$ of the one or more second ions falls within a mass window or pre-determined memory location within which the determined mass or mass to charge ratio $m_1$ of the one or more first ions falls then the method further comprises: (i) determining an average mass or mass to charge ratio m' of the one or more first ions $m_1$ and the one or more second ions $m_2$; and/or (ii) determining the combined intensity I' of the one or more first ions $I_1$ and the one or more second ions $I_2$.

According to another aspect of the present invention there is provided apparatus comprising:

means arranged to digitise a first signal output from an ion detector;

means arranged to determine the mass or mass to charge ratio $m_1$ of one or more first ions;

means arranged to determine the intensity $I_1$ of the one or more first ions;

means arranged to digitise a second signal output from the ion detector;

means arranged to determine the mass or mass to charge ratio $m_2$ of one or more second ions;

means arranged to determine the intensity $I_2$ of the one or more second ions; and means arranged to determine whether the determined mass or mass to charge ratio $m_2$ of the one or more second ions falls within a mass window or pre-determined memory location within which the determined mass or mass to charge ratio $m_1$ of the one or more first ions falls, wherein if it is determined that the determined mass or mass to charge ratio $m_2$ of the one or more second ions falls within a mass window or pre-determined memory location within which the determined mass or mass to charge ratio $m_1$ of the one or more first ions falls then the apparatus further: (i) determines an average mass or mass to charge ratio m' of the one or more first ions $m_1$ and the one or more second ions $m_2$; and/or (ii) determines the combined intensity I' of the one or more first ions $I_1$ and the one or more second ions $I_2$.

According to a preferred embodiment multiple time of flight spectra are preferably acquired by a Time of Flight mass analyser which preferably comprises an ion detector which incorporates an Analogue to Digital Converter. Detected ion signals are preferably amplified and converted into a voltage signal. The voltage signal is then preferably digitised using a fast Analogue to Digital Converter. The digitised signal is then preferably processed.

The start time of discrete voltage peaks present in the digitised signal which correspond to one or more ions arriving at the ion detector are preferably determined. Similarly, the end time of each discrete voltage peak is also preferably determined. The intensity and moment of each discrete voltage peak is then preferably determined. The determined start time and/or end time of each voltage peak, the intensity of each voltage peak and the moment of each voltage peak are preferably used or stored for further processing.

Data from subsequent acquisitions is preferably processed in a similar manner. Once multiple acquisitions have been performed the data from multiple acquisitions is preferably combined and a list of ion arrival times and corresponding intensity values relating to ion arrival events is preferably formed, created or compiled. The times and corresponding intensity values from multiple acquisitions are then preferably integrated so as to form a continuous or continuum spectrum or mass spectrum.

The continuous or continuum spectrum or mass spectrum is preferably further processed. The intensity and arrival time or mass or mass to charge ratio of peaks or mass peaks present in the continuous or continuum spectrum or mass spectrum is preferably determined. A spectrum or mass spectrum comprising the arrival time of ions or the mass or mass to charge ratio of ions and corresponding intensity values is then preferably generated. According to the preferred embodiment time of flight data is preferably converted into mass spectral data.

According to the preferred embodiment a second differential of the ion or voltage signal which is preferably output from the ion detector is preferably determined. The start time of voltage peaks present in the ion or voltage signal is preferably determined as being the time when the second differential of the digitised signal falls below zero. Similarly, the end time of voltage peaks is preferably determined as being the time when the second differential of the digitised signal rises above zero.

According to a less preferred embodiment the start time of a voltage peak may be determined as being the time when the digitised signal rises above a pre-defined threshold value. Similarly, the end time of a voltage peak may be determined as being the time when the digitised signal subsequently falls below a pre-defined threshold value.

The intensity of a voltage peak is preferably determined from the sum of all digitised measurements bounded by the determined start time of the voltage peak and ending with the determined end time of the voltage peak.

The moment of the voltage peak is preferably determined from the sum of the product of each digitised measurement and the number of digitisation time intervals between the digitised measurement and the start time of the voltage peak, or the end time of the voltage peak, for all digitised measurements bounded by the start time and the end time of the voltage peak.

Alternatively, the moment of a voltage peak may be determined from the sum of the running intensity of the voltage peak as the peak intensity is progressively computed, time interval by time interval, by the addition of each successive digitisation measurement, from the start time of the voltage peak to the end time of the voltage peak.

The start time and/or the end time of each voltage peak, the intensity of each voltage peak and the moment of each voltage peak from each acquisition are preferably recorded and are preferably used.

The start time and/or the end time of a voltage peak, the intensity of the voltage peak and the moment of the voltage peak are preferably used to calculate a representative or average time of flight for the one or more ions detected by the ion detector. The representative or average time of flight may then preferably be recorded or stored for further processing.

The representative or average time of flight for the one or more ions may be determined by dividing the moment of the voltage peak by the intensity of the voltage peak in order to determine the centroid time of the voltage peak. The centroid time of the voltage peak may then be added to the start time of the voltage peak, or may be subtracted from the end time of the voltage peak, as appropriate. Advantageously, the representative or average time of flight may be calculated to a higher precision than that of the digitisation time interval.

The representative or average time of flight and the corresponding intensity value associated with each voltage peak from each acquisition is preferably stored. Data from multiple acquisitions is then preferably assembled or combined into a single data set comprising time and corresponding intensity values.

The single data set comprising representative or average time of flight and corresponding intensity values from multiple acquisitions is then preferably processed such that the data is preferably integrated to form a single continuous or continuum mass spectrum. According to an embodiment the time and intensity pairs may be integrated using an integrating algorithm. The data may according to an embodiment be integrated by one or more passes of a box car integrator, a moving average algorithm, or another integrating algorithm.

The resultant single continuous or continuum spectrum or mass spectrum preferably comprises a continuum of intensities at uniform or non-uniform time, mass or mass to charge ratio intervals. If the single continuous or continuum spectrum or mass spectrum comprises a continuum of intensities at uniform time intervals then these time intervals may or may not correspond with a simple fraction or integral multiple of the digitisation time intervals of the Analogue to Digital Converter.

According to the preferred embodiment the frequency of intensity data intervals is preferably such that the number of intensity data intervals across a peak or mass peak is greater than four, more preferably greater than eight. According to an embodiment the number of intensity data intervals across a peak or mass peak may be sixteen or more.

The resultant single continuous or continuum spectrum or mass spectrum may then be further processed such that the data or mass spectral data is preferably reduced to time of flight, mass or mass to charge ratio values and corresponding intensity values.

According to the preferred embodiment the single continuous or continuum spectrum or mass spectrum is preferably processed in a similar manner to the way that the voltage signal from each acquisition is preferably processed in order to reduce the continuous or continuum spectrum or mass spectrum to a plurality of time of flight, mass or mass to charge ratio values and associated intensity values. A discrete mass spectrum may be produced or output preferably by converting time of flight data to mass spectral data.

According to the preferred embodiment the start time or point of each peak, mass or data peak observed in the continuum spectrum or mass spectrum is preferably determined. Similarly, the end time or point of each peak, mass or data peak is also preferably determined. The intensity of each peak, mass or data peak is then preferably obtained. The moment of each peak, mass or data peak is also preferably obtained. The time of flight of each peak, mass or data peak is preferably obtained from the start time or point of the peak, mass or data peak and/or the end time or point of the peak, mass or data peak, the data peak composite intensity and the composite moment of the peak, mass or data peak.

The start time or point of a peak, mass or data peak may be determined as being the time when the continuous or continuum spectrum or mass spectrum rises above a pre-defined threshold value. The subsequent end time or point of a peak, mass or data peak may be determined as being the time when the continuous or continuum spectrum or mass spectrum falls below a pre-defined threshold value.

Alternatively, the start time or point of a peak, mass or data peak may be determined as being the time or point when the second differential of the continuous or continuum spectrum or mass spectrum falls below zero or another value. Similarly, the end time or point of a peak, mass or data peak may be determined as being the time or point when the second differential of the continuous or continuum spectrum or mass spectrum subsequently rises above zero or another value.

The composite intensity of a peak, mass or data peak may be determined from the sum of the intensities of all the mass or data points bounded by the start time or point of the peak, mass or data peak and the end time or point of the peak, mass or data peak.

A composite moment of each peak, mass or data peak is preferably determined from the sum of the product of each mass or data point intensity and the time difference between the mass or data peak time of flight and the start time or point or end time or point, for all mass or data point bounded by the start time or point and the end time or point of the mass or data peak.

The time of flight of a peak, data or mass peak may be determined from dividing the composite moment of the peak, mass or data peak by the composite intensity of the peak, mass or data peak to determine the centroid time of the peak, mass or data peak. The centroid time of a peak, mass or data peak is then preferably added to the start time or point of the peak, mass or data peak, or is subtracted from the end time or point of the peak, mass or data peak, as appropriate. The time of flight of the peak, mass or data peak may be calculated to a higher precision than that of a digitisation time interval and to a higher precision than that of each peak, mass or data peak.

The set of times of flight of each peak, mass or data peak and corresponding intensity values may then be converted into a set of mass or mass to charge ratio values and corresponding intensity values. The conversion of time of flight data to mass or mass to charge ratio data may be performed by converting the data using a relationship derived from a calibration procedure and as such is well known in the art.

BRIEF DESCRIPTION OF THE DRAWINGS

Various embodiments of the present invention will now be described, by way of example only, and with reference to the accompanying drawings in which.

DETAILED DESCRIPTION OF THE PREFERRED EMBODIMENTS

Figure 1:
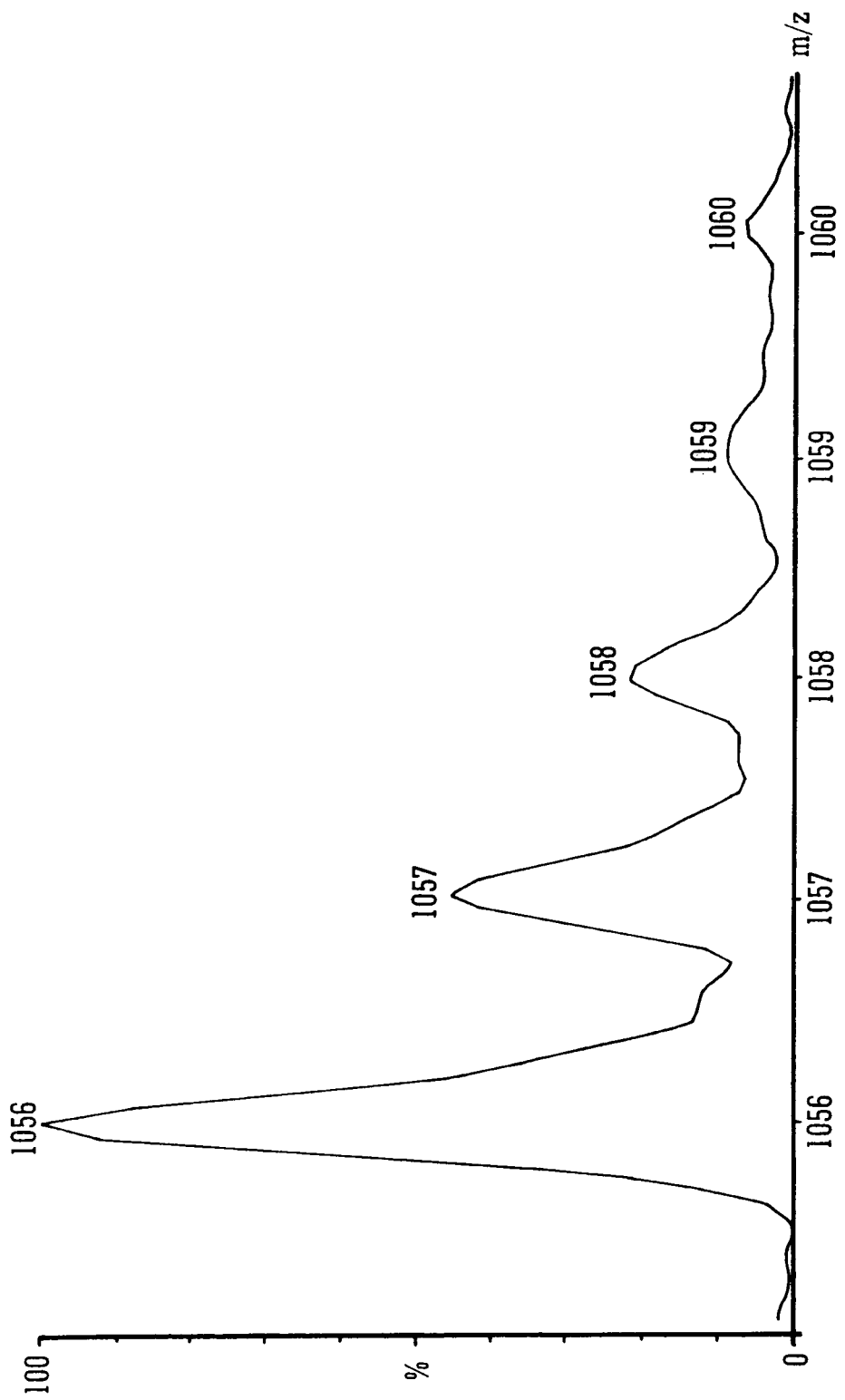
FIG. 1 shows a portion of a raw unprocessed composite mass spectrum of polyethylene glycol as acquired by ionising a sample using a MALDI ion source and mass analysing the resulting ions using an orthogonal acceleration Time of Flight mass analyser.

According to a preferred embodiment a Time of Flight mass analyser is preferably provided which preferably comprises a detector system incorporating an Analogue to Digital Converter rather than a conventional Time to Digital Converter. Ions are preferably mass analysed by the Time of Flight mass analyser and the ions are preferably detected by an ion detector. The ion detector preferably comprises a microchannel plate (MCP) electron multiplier assembly. A current to voltage converter or amplifier is preferably provided which preferably produces a voltage pulse or signal in response to a pulse of electrons being output from the microchannel plate ion detector. The voltage pulse or signal in response to the arrival of a single ion at the ion detector preferably has a width of between 1 and 3 ns at half height.

The voltage pulse or signal resulting from the arrival of one or more ions at the ion detector of the Time of Flight mass analyser is preferably digitised using, for example, a fast 8-bit transient recorder or Analogue to Digital Converter (ADC). The sampling rate of the transient recorder or Analogue to Digital Converter is preferably 1 GHz or faster.

The voltage pulse or signal may be subjected to signal thresholding wherein a constant number or value is preferably subtracted from each output number from the Analogue to Digital Converter in order to remove the majority of any Analogue to Digital Converter noise. If the signal becomes negative following subtraction of the constant number or value then that portion of the signal is preferably reset to zero. Determining the Start and End Times of Voltage Peaks A smoothing algorithm such as a moving average or boxcar integrator algorithm is preferably applied to a spectrum output from the Analogue to Digital Converter. Alternatively, a Savitsky Golay algorithm, a Hites Biemann algorithm or another type of smoothing algorithm may be applied to the data. For example, a single pass of a moving average with a window of three digitisation intervals is given by:

$$s(i)=m(i-1)+m(i)+m(i+1) \quad (1)$$

wherein $m(i)$ is the intensity value in bits recorded in Analogue to Digital Converter time bin i and $s(i)$ is the result of the smoothing procedure.

Multiple passes of a smoothing algorithm may be applied to the data.

Once the raw Time of Flight ADC data has been smoothed, a second differential of the preferably smoothed data is preferably obtained or determined in order to detect the presence of any ion arrival events or peaks.

The zero crossing points of the second differential are preferably determined and are preferably used to indicate or determine the start time and the end time of each observed voltage peak or ion signal peak. This method of peak location is particularly advantageous if the noise level is not constant throughout the time of flight spectrum or if the noise level fluctuates between individual time of flight spectra.

A simple difference calculation with a moving window of three digitisation intervals will produce a first differential of the digitised signal $D1(i)$ which can be expressed by the equation:

$$D1(i)=s(i+1)-s(i-1) \quad (2)$$

wherein $s(i)$ is the result of any smoothing procedure entered for time bin i.

The difference calculation may then preferably be repeated, with a moving window of three digitisation intervals. Accordingly, the second differential $D2(i)$ of the first differential $D1(i)$ will be produced. This may be expressed by the equation:

$$D2(i)=D1(i+1)-D1(i-1) \quad (3)$$

The second differential may therefore be expressed by the equation:

$$D2(i)=s(i+2)-2.s(i)+s(i-2) \quad (4)$$

This difference calculation may be performed with a different width of moving window. The width of the difference window relative to that of the voltage pulse width at half height is preferably between 33% and 100%, and more preferably about 67%.

The second differential $D2(i)$ is preferably integrated to locate or determine the start and end times of observed voltage peaks. The start time t1 of a voltage peak may be taken to be the digitisation interval immediately after the second differential falls below zero. The end time t2 of the voltage peak may be taken to be the digitisation interval immediately before the second differential rises above zero. Alternatively, the start time t1 of a voltage peak may be taken to be the digitisation interval immediately before the second differential falls below zero and the end time t2 of the voltage peak may be taken to be the digitisation interval immediately after the second differential rises above zero.

According to a less preferred embodiment the voltage peak start time t1 may be derived from the digitisation time when the value of the Analogue to Digital Converter output $m(i)$ rises above a threshold level. Similarly, the voltage peak end time t2 may be derived from the digitisation time when the value of the Analogue to Digital Converter output $m(i)$ falls below a threshold level.

Determining the Intensity and Moment of Each Voltage Peak

Once the start and the end times of a voltage peak or ion signal peak have been determined, the intensity and moment of the voltage peak or ion signal peak bounded by the start and end times are preferably determined.

The peak intensity of the voltage or ion signal preferably corresponds to the area of the peak or signal and is preferably described by the following equation:

$$I = \sum_{i=t1}^{i=t2} m_i \quad (5)$$

wherein I is the determined voltage peak intensity, $m_i$ is the intensity value in bits recorded in Analogue to Digital Converter time bin i, t1 is the number of the Analogue to Digital Converter digitisation time bin corresponding to the start of the voltage peak and t2 is the number of the Analogue to Digital Converter digitisation time bin corresponding to the end of the voltage peak.

The moment $M_1$ with respect to the start of the voltage peak is preferably described by the following equation:

$$M_1 = \sum_{i=t1}^{i=t2} m_i \cdot i \quad (6)$$

The moment $M_2$ with respect to the end of the voltage peak is preferably described by the following equation:

$$M_2 = \sum_{i=t1}^{i=t2} m_i \cdot (\delta t - i + 1) \quad (7)$$

where:

$$\delta t = t2 - t1 \quad (8)$$

The calculation of the moment $M_2$ with respect to the end of the peak is of particular interest. It may alternatively be calculated using the following equation:

$$M_2 = \sum_{i} \sum_{i=t1}^{i=t2} m_i \quad (9)$$

This latter equation presents the computation in a form that is very fast to execute. It may be rewritten in the form:

$$M_2 = \sum_{i=t1}^{i=t2} I_i \quad (10)$$

wherein $I_i$ is the intensity calculated at each stage in executing Eqn. 5.

The moment can therefore be computed as the intensity is being computed. The moment is preferably obtained by summing the running total for the intensity at each stage in computing the intensity.

Calculations of this sort may according to an embodiment be performed very rapidly using Field Programmable Gate Arrays (FPGAs) in which calculations on large arrays of data may be performed in an essentially parallel fashion.

The calculated intensity and moment values and the number of the time bin corresponding to the start time and/or the end time of the voltage peak or ion signal are preferably recorded for further processing.

Determining the Centroid Time of Flight Value for Each Voltage Peak

The centroid time $C_1$ of the voltage peak with respect to the start of the peak may be calculated by dividing the moment of the voltage peak by the area or intensity of the voltage peak:

$$C_1 = \frac{M_1}{I} \quad (11)$$

If the time bin recorded as the start of the voltage peak is t1, then the representative or average time t associated with the voltage peak is:

$$t = t1 + C_1 \quad (12)$$

On the other hand, the centroid time $C_2$ of the voltage peak with respect to the end of the peak may be calculated from:

$$C_2 = \frac{M_2}{I} \quad (13)$$

If the time bin recorded as the end of the voltage peak is t2, then the representative or average time t associated with the voltage peak is:

$$t = t2 - C_2 \quad (14)$$

The precision of the calculated value of t is dependent upon the precision of the division computed in Eqns. 11 or 13. The division calculation is relatively slow compared to the other calculations in this procedure and hence the higher the required precision the longer the calculation takes.

According to an embodiment the start and end times t1,t2 of each voltage peak in a spectrum, the corresponding intensity I and the calculated moments $M_1$ or $M_2$ are preferably recorded. The corresponding ion arrival time(s) t may be calculated off line. This approach allows t to be computed to whatever precision is required. Alternatively, the value of t may be calculated in real time.

Storing the Ion Arrival Times and Corresponding Intensity Values in an Array of Memory Locations A single time of flight spectrum may comprise several voltage peaks due to a number of ions arriving at the detector. Each voltage peak is preferably analysed and converted into a time value and a corresponding intensity value. The time and intensity values for each voltage peak are preferably stored in one of an array of memory locations. The array of memory locations preferably correspond or relate to predetermined time intervals or subdivisions of the Time of Flight spectrum. For example, a time of flight spectrum may have a duration of 100 μs and the spectrum may be sub-divided into an array of 500,000 equal time intervals. Each time interval or subdivision will have a width or duration of 200 ps.

Combining the Time and Intensity Values from Multiple Time of Flight Spectra Subsequent time of flight spectra are preferably obtained and processed in a similar manner to that described above i.e. the spectra are preferably analysed and time and intensity values corresponding to ion arrival events are preferably determined. If the determined time of flight of an ion from a subsequent time of flight spectrum falls within a time interval, subdivision or memory array element which already contains a time and corresponding intensity value, then according to the preferred embodiment the two data values are preferably combined to yield a new single time value and a corresponding intensity value. The new time of flight value t is preferably calculated using a weighted average or centre of mass calculation:

$$t' = \frac{t_1 \cdot I_1 + t_2 \cdot I_2}{I_1 + I_2} \quad (15)$$

wherein $t_1$ is the time of flight of an ion from a first time of flight spectrum and $I_1$ is the corresponding intensity value and wherein $t_2$ is the time of flight of an ion from a second time of flight spectrum and $I_2$ is the corresponding intensity value. Both $t_1$ and $t_2$ fall within the same time interval, subdivision or memory array element.

The new intensity I' is preferably calculated by adding the two intensities:

$$I' = I_1 + I_2 \quad (16)$$

The procedure described above of combining data in a weighted manner for data which falls within the same time interval, subdivision or memory array element is preferably repeated for the required number of time of flight spectra. Once the process is complete, an ordered list of time and corresponding intensity values is preferably produced.

Further Processing of the Composite Time and Intensity Data

According to an embodiment the time and intensity pairs are then further processed by applying a smoothing function to the data so that a continuum spectrum is provided. The preferably smoothed data is then preferably subject to peak detection and peak centroid calculations in a similar manner to that discussed above in respect of voltage peaks. Accordingly, a second differential of the continuum spectrum is preferably obtained and the start and end times of peaks are preferably determined. The intensity and centroid times of each peak are preferably determined. The width and increment used in the smoothing and double difference calculations may be unrelated to the digitisation rate of the ADC.

According to the preferred embodiment the intensity and time of flight values resulting from multiple spectra are preferably assembled into a single composite list. The composite set of data is then preferably processed using, for example, a moving average or boxcar integrator algorithm. The moving window preferably has a width in time of W(t) and the increment in time by which the window is stepped is preferably S(t). Both W(t) and S(t) may be assigned values which are completely independent of each other and completely independent of the Analogue to Digital Converter digitisation interval. Both W(t) and S(t) may have constant values or may be a variable function of time.

According to the preferred embodiment, the width of the integration window W(t) relative to the width of the mass peak at half height is preferably between 33% and 100%, and more preferably about 67%. The step interval S(t) is preferably such that the number of steps across the mass peak is at least four, or more preferably at least eight, and even more preferably sixteen or more.

Intensity data within each window is preferably summed and each intensity sum is preferably recorded along with the time interval corresponding to the step at which the sum is computed.

If n is the number of steps of the stepping interval S(t) for which the time is T(n), the sum G(n) from the first pass of a simple moving average or boxcar integrator algorithm is given by:

$$G(n) = \sum_{t=T(n)-0.5 \cdot W(T)}^{t=T(n)+0.5 \cdot W(T)} I(t) \quad (17)$$

wherein T(n) is the time after n steps of the stepping interval S(t), I(t) is the intensity of a voltage peak recorded with an average or representative time of flight t, W(T) is the width of the integration window at time T(n), and G(n) is the sum of all voltage peak intensities with a time of flight within the integration window W(T) centered about time T(n).

According to an embodiment multiple passes of the integration algorithm may be applied to the data. A smooth continuum composite data set is then preferably provided. The resulting continuum composite data set or continuum mass spectrum may then preferably be further analysed.

Analysing the Composite Continuum Spectrum or Mass Spectrum

The peak centroid times and intensities calculated from the data are preferably stored and represent the composite spectrum for all the acquired data.

According to this method the precision of each individual measurement is preferably retained whilst enabling the amount of data to be compressed thereby decreasing the processing requirements.

According to the preferred embodiment, the list of intensity and corresponding average or representative time of flight pairs is preferably converted into mass spectral data comprising mass or mass to charge ratio values and intensity so that a mass spectrum is preferably produced.

According to the preferred embodiment a second differential of the smooth continuum composite data set or continuum mass spectrum is preferably determined.

The zero crossing points of the second differential of the continuum mass spectrum are preferably determined. The zero crossing points of the second differential indicate the start time and the end time of peaks or mass peaks in the composite continuum data set or mass spectrum.

The first and second differentials can be determined by two successive difference calculations. For example, a difference calculation with a moving window of 3 step intervals which will produce a first differential H1(n) of the continuum data G and may be expressed by the equation:

$$H1(n) = G(n+1) - G(n-1) \quad (18)$$

wherein G(n) is the final sum of one or more passes of the integration algorithm at step n.

If this simple difference calculation is repeated, again with a moving window of 3 digitisation intervals, this will produce a second differential H2(n) of the first differential H1(n). This may be expressed by the equation:

$$H2(i) = H1(i+1) - H1(i-1) \quad (19)$$

The combination of the two difference calculations may be expressed by the equation:

$$H2(n) = G(n+2) - 2 \cdot G(n) + G(n-2) \quad (20)$$

This difference calculation may be performed with a different width of moving window. The width of the difference window relative to that of the mass peak width at half height is preferably between 33% and 100%, and more preferably about 67%.

The second differential H2(n) is preferably used to locate the start and end times of peaks or mass peaks observed in the continuum spectrum or mass spectrum. The start time T1 of a peak or mass peak is preferably the stepping interval after which the second differential falls below zero. The end time T2 of a peak or mass peak is preferably the stepping interval before which the second differential rises above zero. Alternatively, the start time T1 of a peak or mass peak may be the stepping interval before which the second differential falls below zero and the end time T2 of the peak or mass peak may be the stepping interval after which the second differential rises above zero.

According to another embodiment the start time T1 of the peak or mass peak may be interpolated from the stepping intervals before and after the second differential falls below zero, and the end time T2 of the peak may be interpolated from the stepping interval before and after the second differential rises above zero.

According to a less preferred embodiment the peak or mass peak start time T1 and the peak or mass peak end time T2 may be derived from the stepping times for which the value of the integration procedure output G rises above a threshold level and subsequently falls below a threshold level.

Once the start time and the end time of a peak or mass peak have been determined, values corresponding to the intensity and moment of the peak or mass peak within the bounded region are preferably determined. The intensity and moment of the peak or mass peak are preferably determined from the intensities and time of flights of the peak or mass peaks bounded by the peak or mass peak start time and the peak or mass peak end time.

The peak or mass peak intensity corresponds to the sum of the intensity values bounded by the peak or mass peak start time and the peak or mass peak end time, and may be described by the following equation:

$$A = \sum_{t=T1}^{t=T2} I_t \quad (21)$$

wherein A is the peak or mass peak intensity, $I_t$ is the intensity of the peak or mass peak with time of flight t, T1 is the start time of the peak or mass peak and T2 is the end time of the peak or mass peak.

The moment of each peak or mass peak is preferably determined from the sum of the moments of all the peaks or mass peaks bounded by the peak or mass peak start time and the peak or mass peak end time.

The moment $B_1$ of the peak or mass peak with respect to the start of the peak is preferably determined from the intensity and time difference of each peak or mass peak with respect to the peak or mass peak start time and is preferably given by the following equation:

$$B_1 = \sum_{t=T1}^{t=T2} I_t \cdot (t - T1) \quad (22)$$

The moment $B_2$ with respect to the peak or mass peak end time is given by the following equation:

$$B_2 = \sum_{t=T1}^{t=T2} I_t \cdot (T2 - t) \quad (23)$$

There is no particular advantage to be gained by calculating the moment $B_2$ with respect to the peak or mass peak end time as opposed to calculating the moment $B_1$ with respect to the start of the peak or mass peak.

The representative or average time Tpk associated with the peak or mass peak is given by:

$$Tpk = \left(T1 + \frac{B_1}{A}\right) = \left(T2 - \frac{B_2}{A}\right) \quad (24)$$

The precision of the calculated value of Tpk is dependent on the precision of the division computed in Eqn. 24 and may be computed to whatever precision is required.

Converting Time of Flight Data into Mass Spectral Data

The values Tpk and A for each peak or mass peak are preferably stored as a list within a computer memory. The list of peaks or mass peaks may be assigned masses or mass to charge ratios using their time of flights and a relationship between time of flight and mass derived from a calibration procedure. Such calibration procedures are well known in the art.

The simplest form of a time to mass relationship for a Time of Flight mass spectrometer is given below:

$$M = k \cdot (t + t^*)^2 \quad (25)$$

wherein $t^*$ is an instrumental parameter equivalent to an offset in flight time, k is a constant and M is the mass to charge ratio at time t.

More complex calibration algorithms may be applied to the data. For example, the calibration procedures disclosed in GB-2401721 (Micromass) or GB-2405991 (Micromass) may be used.

Alternative Embodiment Wherein Time of Flight Data is Initially Converted into Mass Spectral Data According to an alternative embodiment the time of flight values associated with each voltage peak may initially be converted to mass or mass to charge ratio values using the time to mass relationship as described above in Eqn. 25. The mass or mass to charge ratios and corresponding intensity values are preferably stored in an array of memory locations which preferably correspond or relate to predetermined intervals or subdivisions of a mass spectrum.

The integration procedure described above is then preferably applied to any mass data which falls within the same mass interval, subdivision or memory array element of the mass spectrum. A single composite mass spectrum is therefore formed rather than a list of time and intensity values which are converted into a mass spectrum at a final stage in the process.

The integration window W(m) and/or the stepping interval S(m) may each be set to be constant values or functions of mass. For example, the stepping interval function S(m) may be set such as to give a substantially constant number of steps over each mass spectral peak.

This method has several advantages over other known methods. The precision and accuracy of the measurement is preferably improved relative to other arrangements which may use a simple measurement of the maxima or apex of the signal. This is a result of using substantially the entire signal recorded within the measurement as opposed to just measuring at or local to the apex. The preferred method also gives an accurate representation of the mean time of arrival when the ion signal is asymmetrical due to two or more ions arriving at substantially similar times. Signal maxima measurements will no longer reflect the mean arrival time or relative intensity of these signals.

The value of time t associated with each detected ion signal may be calculated with a precision higher than the original precision imposed by the digitisation rate of the Analogue to Digital Converter. For example, for a voltage peak width at half height of 2.5 ns, and an Analogue to Digital Converter digitisation rate of 2 GHz the time of flight may typically be calculated to a precision of ±125 ps or better.

According to this embodiment time data is preferably initially converted to mass or mass to charge ratio data. A combine algorithm is then preferably used which preferably operates on the mass or mass to charge ratio data.

According to this embodiment the arrival time calculated for each ion signal is preferably initially squared. Values associated with ion arrivals are therefore now related directly to the mass or mass to charge ratio of the ions. The mass or mass to charge ratio value may also be multiplied by a factor to convert the mass or mass to charge ratio to nominal mass.

The mass or mass to charge ratio value and area (i.e. intensity) calculated for each ion signal is preferably stored in one of an array of memory locations corresponding to predetermined mass or mass to charge ratio intervals which preferably subdivide the spectrum. For example, the mass or mass to charge ratio value and corresponding area may be stored in an array having intervals of 1/256 mass units.

If the mass or mass to charge ratio value recorded for an ion signal within a subsequent data set falls within a predetermined mass or mass to charge ratio interval, subdivision or memory array element which already contains a mass or mass to charge ratio value and a corresponding intensity value, then the two data values are preferably combined to yield a single mass or mass to charge ratio value and a single corresponding intensity value. The new mass or mass to charge ratio value m' is preferably calculated using a weighted average or centre of mass calculation:

$$m' = \frac{m_1 \cdot I_1 + m_2 \cdot I_2}{I_1 + I_2} \quad (26)$$

wherein $m_1$ is the mass or mass to charge value of an ion from a first data set and $I_1$ is the corresponding intensity value and $m_2$ is the mass or mass to charge value of an ion from a second data set and $I_2$ is the corresponding intensity value. Both $m_1$ and $m_2$ fall within the same mass or mass to charge ratio window, interval, subdivision or memory array element.

The new intensity I' is preferably calculated by simple addition of the two intensities:

$$I' = I_1 + I_2 \quad (27)$$

The procedure described above is preferably repeated for the required number of time of flight spectra so that a final composite ordered list of mass or mass to charge ratio values and corresponding intensity values is preferably produced.

The composite mass or mass to charge ratio data may then be further processed by application of a smoothing function to provide a continuum mass spectrum. Peak detection and peak centroid calculations are then preferably calculated based upon the continuum mass spectrum in a manner substantially as described above. The detected and measured peaks preferably correspond to individual mass peaks. The width and increment used in the smoothing and double difference calculations is preferably in units of mass or mass to charge ratio and is preferably unrelated to the digitisation rate of the ADC.

The peak centroid mass or mass to charge ratios and corresponding intensities of the mass peaks are preferably stored and represent the composite spectrum for all the acquired data.

According to this embodiment each ion arrival time is converted to mass or mass to charge ratio directly after initial detection.

Subtracting Background Peaks

According to an embodiment the process of combining time or mass data falling within the same time or mass interval, subdivision or memory array element may use up to three scan ranges and a background factor. The first range (Average) preferably defines the range of scans across the chromatogram peak top that are to be averaged together to form a representative spectrum for the compound of interest.

Either one or two other ranges (Subtract) may be used to define a range of scans from the background of the chromatogram on each side of the peak. These scans are preferably averaged together to form a representative background spectrum.

Finally, the background spectrum intensities may be multiplied by the background factor (X) and may then be subtracted from the averaged peak-top spectrum to form the combine spectrum.

The combine process preferably has three stages. The first stage is to divide the mass scale and to separately merge spectra in both the Average and Subtract ranges thereby forming the merged average spectrum and the merged subtract spectrum. The second stage is to perform the subtraction and to form the merged result spectrum. The third stage is to reform the mass scale.

In the first and third stages, peak masses and intensities are preferably computed based on the following equations:

MassCurr=((MassCurr*IntCurr)+(MassNew*IntNew))/(IntCurr+IntNew)

IntCurr=IntCurr+IntNew wherein MassCurr is the current adjusted mass, MassNew is the new mass, IntCurr is the current adjusted intensity and IntNew is the new intensity.

According to the first stage, the mass range may be divided up, for example; into 0.0625 amu width mass windows which are preferably centred on nominal mass. Accordingly, the mass range between 41.00 and 42.00 would be divided up using the following boundaries:

| |
|---|
| 40.96875 |
| 41.03125 |
| 41.09375 |
| 41.15625 |
| 41.21875 |
| 41.28125 |
| 41.34375 |
| 41.40625 |
| 41.46875 |
| 41.53125 |
| 41.59375 |
| 41.65625 |
| 41.71875 |
| 41.78125 |
| 41.84375 |
| 41.90625 |
| 41.96875 |
| 42.03125 |

Using all scans in turn in the Average range, each peak mass is then preferably allocated to one of these mass windows. If there is already a peak or a merger of peaks in a particular mass window, then the peak preferably has its mass (MassNew) and intensity (IntNew) values merged with the current values (MassCurr,IntCurr) to form new current values.

For example, adding a peak with a mass of 44.5791 and intensity 1671 to a mass window which contains data having a current mass 44.5635 and current intensity 1556 would initiate the following merger:

$$MassCurr = ((44.5635 * 1556) + (44.5791 * 1671))/$$
$$(1556 + 1671)$$
$$= 44.5716$$
$$IntCurr = 1556 + 1671 = 3227$$

When all peaks of all scans in the Average range have been processed, the intensities (IntCurr) in each window are then preferably divided by the total number of scans in the Average range to form the merged average spectrum.

The same process is then preferably performed using all scans in the Subtract range. The final intensities are preferably divided by the total number of scans in the Subtract range. If there are two Subtract ranges then the final intensities are preferably divided by the total number of scans in both ranges.

All intensity values are preferably multiplied by the magnification factor (X) to create a merged subtract spectrum.

Preferred Embodiment

An important aspect of the preferred embodiment of the present invention is that the voltage peak times may be stored with a precision which is substantially higher than that afforded by the ADC digitisation intervals or a simple fraction of the ADC digitisation intervals.

According to one embodiment the data may be processed so as to result in a final spectrum wherein the number of step intervals over each mass spectral peak (ion arrival envelope) is substantially constant. It is known that for time of flight spectra recorded using a constant digitisation interval or which are constructed from many time of flight spectra using a histogramming technique with constant bin widths, the number of points per mass peak (ion arrival envelope) increases with mass. This effect can complicate further processing and can lead to an unnecessary increase in the amount of data to be stored. According to this embodiment there are no constraints over the choice of stepping interval and the stepping interval function may be set to obtain a constant number of steps across each mass peak.

The following analysis illustrates an example of such a stepping interval function. Apart from at low mass to charge ratio values, the resolution R of an orthogonal acceleration Time of Flight mass spectrometer is approximately constant with mass to charge ratio:

$$R = \frac{t}{2\Delta t} \quad (28)$$

wherein R is the mass resolution, t is the time of flight of the mass peak and $\Delta t$ is the width of the ion arrival envelope forming the mass peak.

Where the resolution is approximately constant, the peak width is proportional to the time of flight t:

$$\Delta t = \frac{t}{2R} \quad (29)$$

Accordingly, in order to obtain an approximately constant number of steps across a mass peak, the step interval S(t) needs to increase approximately in proportion to the time of flight t.

For mass spectrometers where there is a more complex relationship between resolution and mass it may be desirable to use a more complex function relating the stepping intervals S(t) and time of flight t.

The preferred embodiment of the present invention will now be illustrated with reference to FIGS. 1-7.

FIG. 1 shows a portion of a mass spectrum obtained from mass analysing a sample of polyethylene glycol. The sample was ionised using a Matrix Assisted Laser Desorption Ionisation (MALDI) ion source. The mass spectrum was acquired using an orthogonal acceleration Time of Flight mass analyser. The mass spectrum shown in FIG. 1 is the result of combining or summing 48 individual time of flight spectra which were generated by firing the laser 48 times i.e. 48 separate acquisitions were obtained. The spectra were acquired or recorded using a 2 GHz 8-bit Analogue to Digital Converter.

Figure 2:
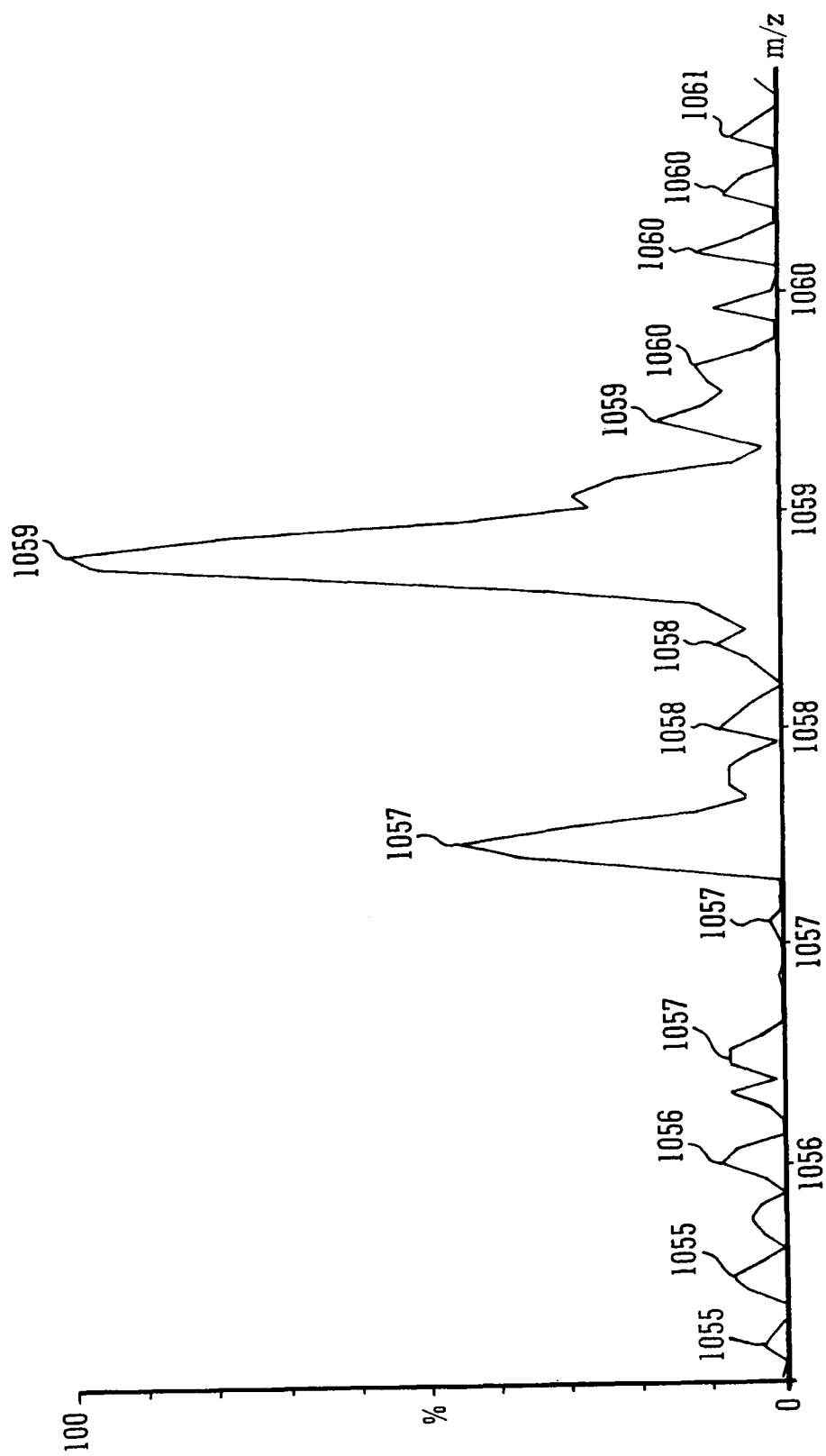
FIG. 2 shows a spectrum which was acquired from a single experimental run and which was summed together with other spectra to form the composite mass spectrum shown in FIG. 1.

FIG. 2 shows an individual spectrum across the same mass to charge ratio range as shown in FIG. 1. The signals arise from individual ions arriving at the ion detector.

Figure 3:
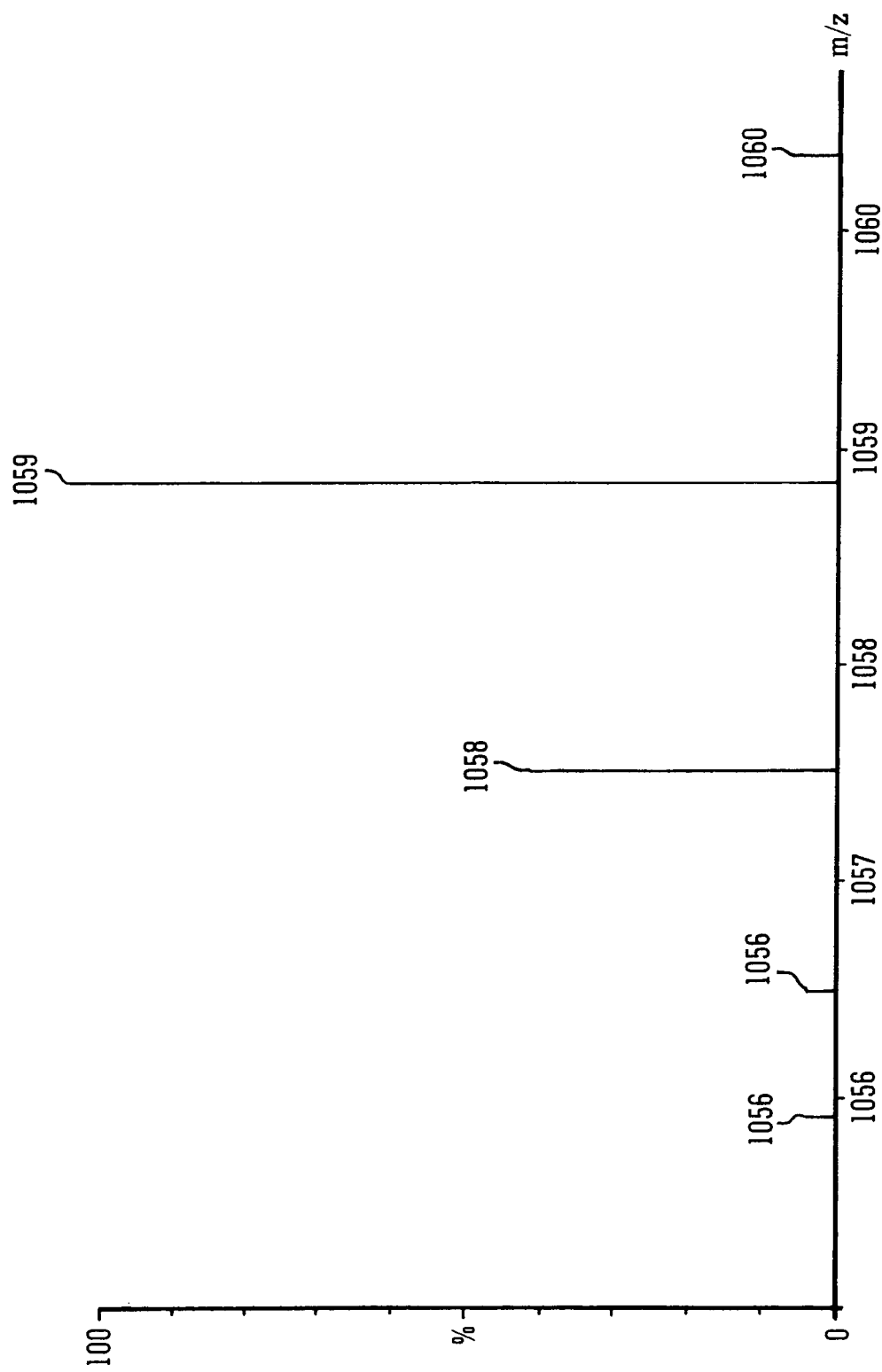
FIG. 3 shows the spectrum shown in FIG. 2 after being processed according to the preferred embodiment to provide data in the form of mass to charge and intensity pairs.

FIG. 3 shows the result of processing the individual spectrum shown in FIG. 2 according to an embodiment of the present invention by using a two pass moving average smoothing function (Eqn. 1) with a smoothing window of seven time digitisation points. The smoothed signal was then differentiated twice using a three-point moving window difference calculation (Eqn. 4). The zero crossing points of the second differential were determined as being the start and the end points of the signals of interest within the spectrum. The centroid of each signal was then determined using Eqn. 13. The time determined by Eqn. 14 and the intensity of each detected signal was recorded. The resulting processed mass spectral data is shown in FIG. 3 in the form of intensity-time pairs. The precision of the determination of the centroid calculation for each ion arrival was higher than the precision afforded by the individual time intervals of the Analogue to Digital Converter.

Figure 4:
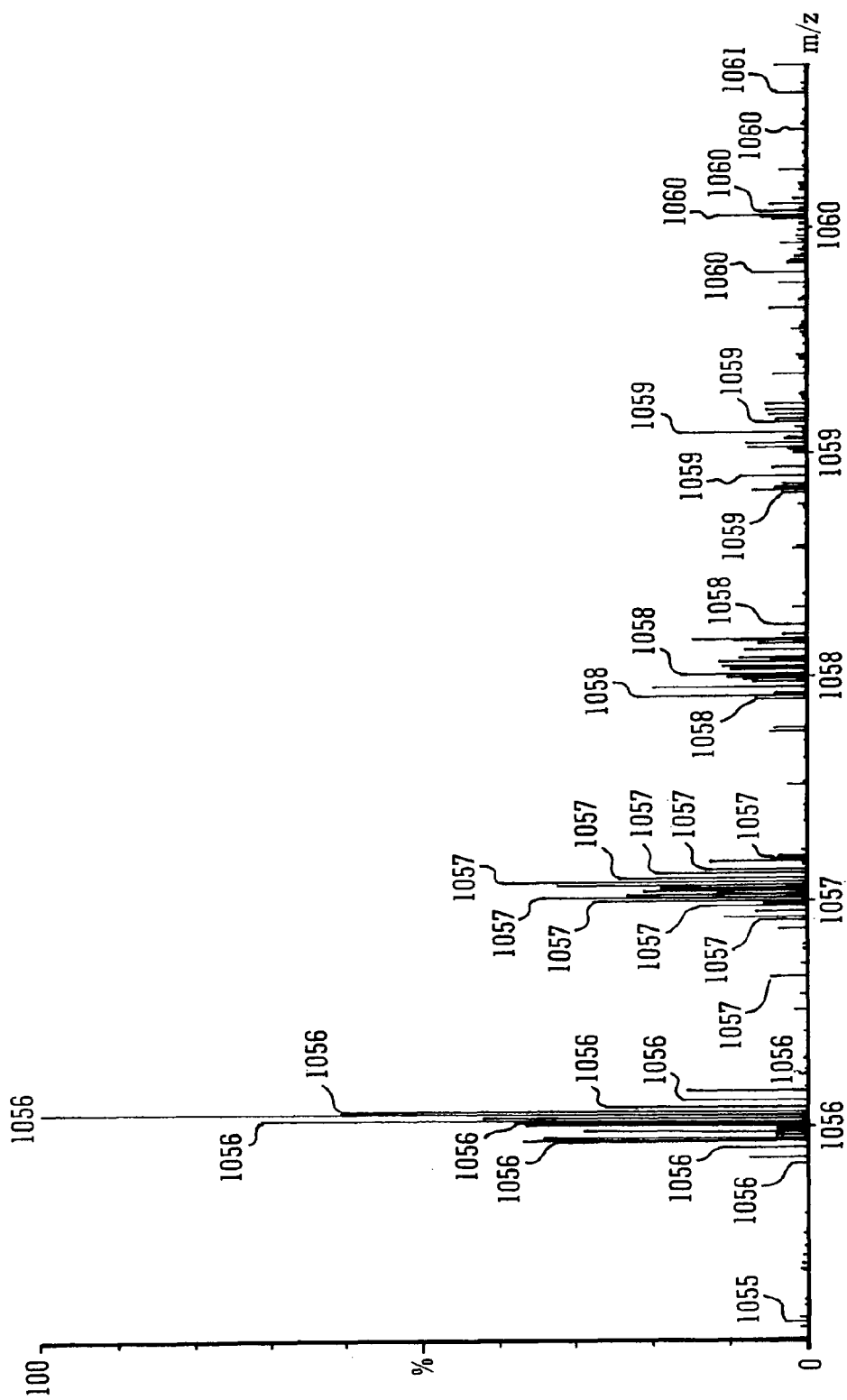
FIG. 4 shows the result of summing or combining 48 separate processed time of flight mass spectra.

FIG. 4 shows the result according to the preferred embodiment of combining the 48 individual spectra which have each been pre-processed using the method described above in relation to FIG. 3. The 48 sets of processed data comprising intensity-time pairs were combined to form a composite set of data comprising a plurality of intensity-time pairs.

Figure 5:
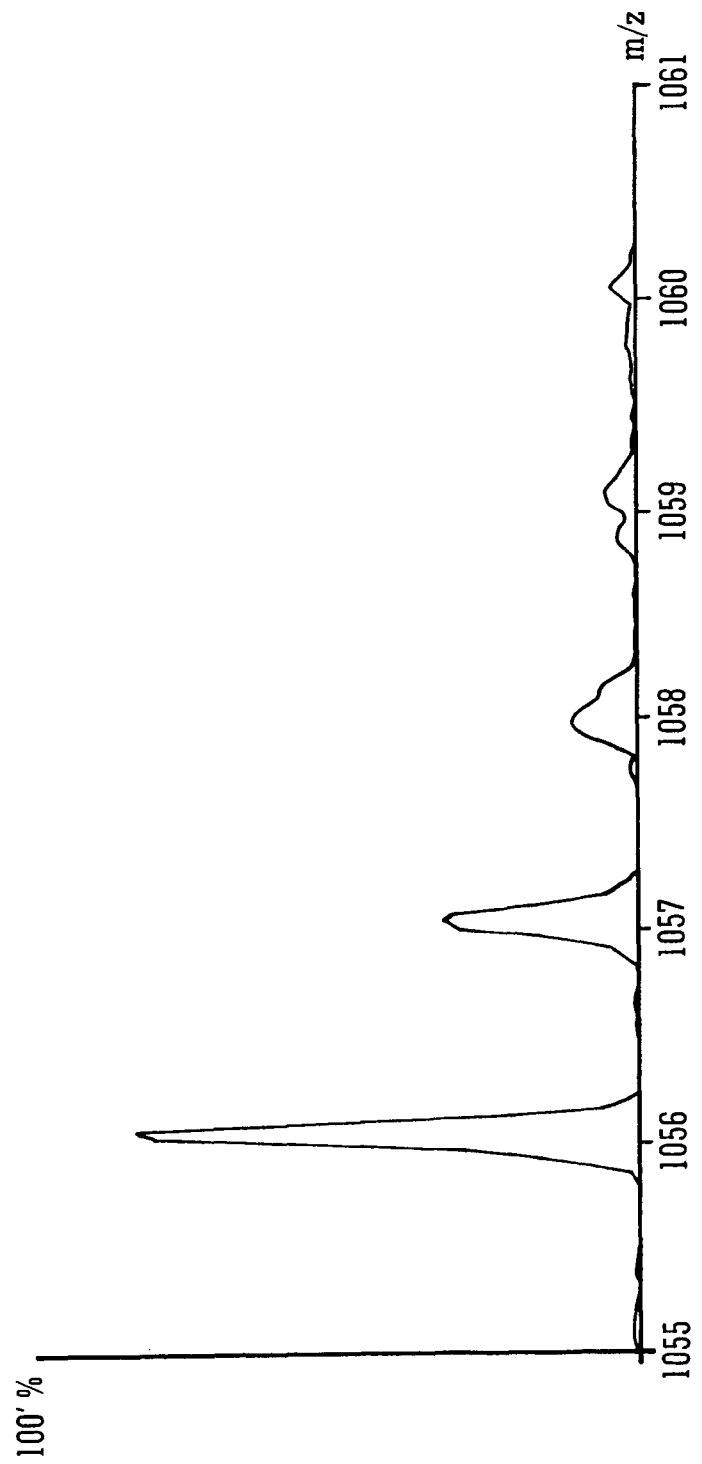
FIG. 5 shows the result of integrating the pairs of data shown in FIG. 4 using a boxcar integration algorithm in order to form a continuum mass spectrum.

Once a composite set of data as shown in FIG. 4 has been provided or obtained, then according to the preferred embodiment the composite data, set is preferably integrated using, for example, two passes of a boxcar integration algorithm. According to an embodiment the integration algorithm may have a width of 615 ps and step intervals of 246 ns. The resulting integrated and smoothed data set or continuum mass spectrum is shown in FIG. 5. It can be seen that the mass resolution and the signal to noise within the spectrum is greatly improved compared to the raw Analogue to Digital Converter data or mass spectrum as shown in FIG. 1.

Figure 6:
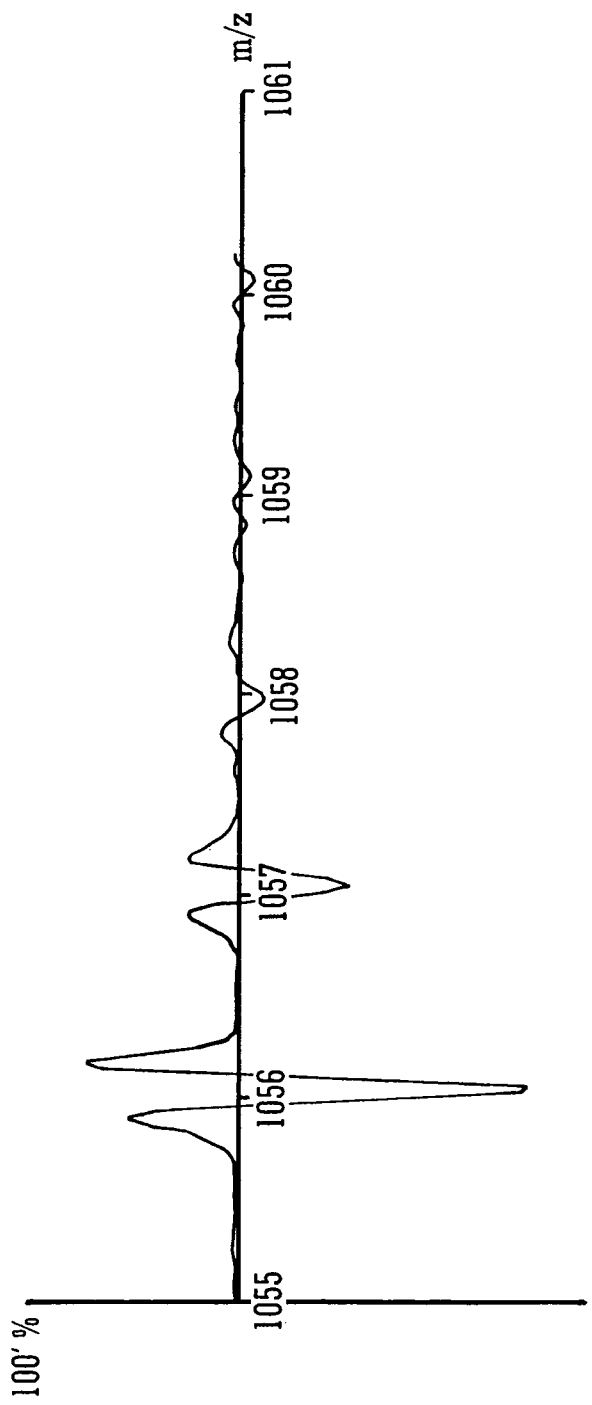
FIG. 6 shows the second differential of the continuum mass spectrum shown in FIG. 5.

FIG. 6 shows the second differential of the single processed continuum mass spectrum as shown in FIG. 5. The second differential was derived using a moving window of 1.23 ns. The zero crossing points of the second differential were used to determine the start and end points of the mass peaks observed within the continuum mass spectrum.

Figure 7:
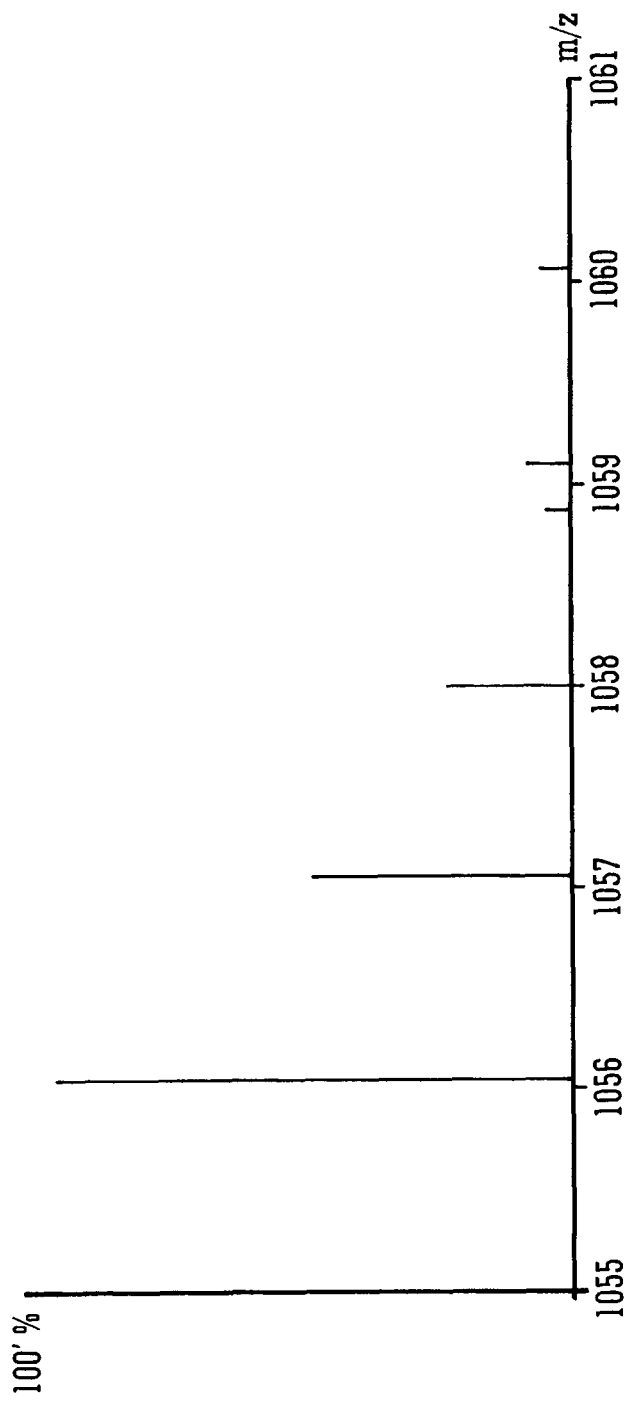
FIG. 7 shows the resultant mass peaks derived from the data shown in FIG. 4 by reducing the continuum mass spectrum shown in FIG. 5 to a discrete mass spectrum.

FIG. 7 shows the final mass to charge ratio and corresponding intensity values as obtained according to the preferred embodiment. According to the preferred embodiment the 48 spectra shown in FIG. 4 were integrated into a continuum mass spectrum and then the continuum mass spectrum was reduced to a discrete mass spectrum. The time of flight for each mass peak was determined using Eqn. 24 and the intensity of each mass peak was determined using Eqn. 21.

For all the spectra shown in FIGS. 1-7 the time axis has been converted into a mass to charge ratio axis using a time to mass relationship derived from a simple calibration procedure. At the masses shown the ADC digitisation interval of 0.5 ns is approximately equivalent to 0.065 Daltons in mass.

According to the preferred embodiment the time of flight detector (secondary electron multiplier) may comprise a microchannel plate, a photomultiplier or an electron multiplier or combinations of these types of detectors.

The digitisation rate of the ADC may be uniform or non-uniform.

According to an embodiment of the present invention the calculated intensity I and time of flight t of several voltage peaks may be combined into a single representative peak. If the number of voltage peaks in a spectrum is large and/or the number of spectra is large, then the final total number of voltage peaks may become very large. Therefore, combining data in this manner will advantageously reduce the memory requirements and the subsequent processing time.

Single representative peaks may be composed of constituent voltage peaks with a sufficient narrow range of times such that the integrity of the data is not compromised and so that the mass spectra maintain their resolution. It is desirable that peak or mass peak start and end times can still be determined with sufficient accuracy such that resultant peaks or mass peaks are composed of substantially the same voltage peaks that they would have had not this initial merging of peaks taken place. The single representative peak preferably has an intensity and time of flight that accurately represents the combined intensity and the combined weighted time of flight of all the constituent voltage peaks. The intensity and time of flight of the resultant peak or mass peak is preferably substantially the same irrespective of whether or not some merging of voltage peaks has occurred in the processing of the data.

Although the present invention has been described with reference to preferred embodiments, it will be understood by those skilled in the art that various changes in form and detail may be made to the particular embodiments discussed above without departing from the scope of the invention as set forth in the accompanying claims.

The invention claimed is:

1. A method of mass spectrometry comprising:
obtaining a first signal output from an ion detector over an acquisition time period which is divided into n time periods or time windows wherein n is more than one;
digitising the first signal output from the ion detector to produce a first digitised signal;
determining a second differential or a second difference of said first digitised signal;
determining the arrival time $T_1$ of one or more first ions from said second differential or said second difference of said first digitised signal;
determining the intensity $I_1$ of said one or more first ions;
digitising a second signal output from said ion detector to produce a second digitised signal;
determining a second differential or a second difference of said second digitised signal;
determining the arrival time $T_2$ of one or more second ions from said second differential or said second difference of said second digitised signal;
determining the intensity $I_2$ of said one or more second ions;
determining whether the determined arrival time $T_2$ of said one or more second ions falls within a time period or time window, of the n time periods or time windows, within which the determined arrival time $T_1$ of said one or more first ions falls, wherein if it is determined that the determined arrival time $T_2$ of said one or more second ions falls within said time period or time window within which the determined arrival time $T_1$ of said one or more first ions falls, regardless of the difference between $T_1$ and $T_2$, then said method further comprises: (i) determining a weighted mathematical average arrival time T' of said one or more first ions $T_1$ and said one or more second ions $T_2$; or (ii) determining the combined intensity I' of said one or more first ions $I_1$ and said one or more second ions $I_2$; and
combining data from said first and second digitised signals to provide a mass spectrum with peaks or to provide a histogram.

2. A method as claimed in claim 1, further comprising using an Analogue to Digital Converter or a transient recorder to digitise said first signal or said second signal.

3. A method as claimed in claim 1, further comprising smoothing said first digitised signal or said second digitised signal.

4. A method as claimed in claim 1, wherein said step of determining the arrival time $T_1$ of one or more first ions from said second differential of said first digitised signal comprises determining one or more zero crossing points of said second differential of said first digitised signal.

5. A method as claimed in claim 1, further comprising determining the intensity or moment of one or more peaks present in said first digitised signal or said second digitised signal which correspond to one or more ion arrival events.

6. A method as claimed in claim 1, further comprising determining the centroid time of one or more peaks present in said first digitised signal or said second digitised signal which correspond to one or more ion arrival events.

7. A method as claimed in claim 1, further comprising determining the average or representative time of one or more peaks present in said first digitised signal or said second digitised signal which correspond to one or more ion arrival events.

8. A method as claimed in claim 1, wherein said step of determining the arrival time $T_2$ of one or more second ions from said second differential of said second digitised signal comprises determining one or more zero crossing points of said second differential of said second digitised signal.

9. A method as claimed in claim 1, further comprising:
digitising one or more further signals output from said ion detector to produce one or more further digitised signals;
determining a second differential or a second difference of said one or more further digitised signals; determining the arrival time $T_n$ of one or more further ions from said second differential or said second difference of said one or more farther digitised signals;
determining the intensity $I_n$ of said one or more further ions; and
determining whether the determined arrival time $T_n$ of said one or more further ions falls within a time period or time window within which the determined arrival time $T_0$ of one or more other ions falls, wherein if it is determined that the determined arrival time $T_n$ of said one or more further ions falls within said time period or time window within which the determined arrival time $T_0$ of said one or more other ions falls then said method further comprises: (i) determining an average arrival time $T_{n'}$ of said one or more further ions $T_n$ and said one or more other ions $T_0$; or (ii) determining the combined intensity $I_{n'}$ of said one or more further ions $I_n$ and said one or more other ions $I_0$.

10. A method as claimed in claim 1, further comprising storing the determined times or average times or intensities of one or more peaks present in said digitised signals which correspond to one or more ion arrival events.

11. A method as claimed in claim 1, further comprising combining data from said first, second and one or more further digitised signals relating to the time and intensity of peaks relating to ion arrival events to provide a continuum time or mass spectrum.

12. Apparatus comprising:
means arranged to obtain first signal output from ion detector over an acquisition time period divided into n time periods or time windows wherein n is more than one;
means arranged to digitise the first signal output from the ion detector to produce a first digitised signal;
means arranged to determine a second differential or second difference of said first digitised signal;
means arranged to determine the arrival time $T_1$ of one or more first ions from said second differential or second difference of said first digitised signal;
means arranged to determine the intensity $I_1$ of said one or more first ions;
means arranged to digitise a second signal output from said ion detector to produce a second digitised signal;
means arranged to determine a second differential or second difference of said second digitised signal;
means arranged to determine the arrival time $T_2$ of one or more second ions from said second differential or second difference of said second digitised signal;
means arranged to determine the intensity $I_2$ of said one or more second ions; and
means arranged to determine whether the determined arrival time $T_2$ of said one or more second ions falls within a time period or time window, of the n time periods or time windows, within which the determined arrival time $T_1$ of said one or more first ions falls, wherein if it is determined that the determined arrival time $T_2$ of said one or more second ions falls within said time period or time window within which the determined arrival time $T_1$ of said one or more first ions falls, regardless of the difference between $T_1$ and $T_2$, then said apparatus further: (i) determines a weighted mathematical average arrival time T' of said one or more first ions $T_1$ and said one or more second ions $T_2$; or (ii) determines the combined intensity I' of said one or more first ions $I_1$ and said one or more second ions $I_2$; and
means for combining data from said first and second digitised signals to provide a mass spectrum with peaks or to provide a histogram.

13. Apparatus as claimed in claim 12, further comprising an Analogue to Digital Converter or a transient recorder to digitise said first signal or said second signal.

14. A mass spectrometer comprising:
the apparatus as claimed in claim 12; and
a mass analyser selected from the group consisting of: (i) a Time of Flight ("TOF") mass analyser; (ii) an orthogonal acceleration Time of Flight ("oaTOF") mass analyser; or (iii) an axial acceleration Time of Flight mass analyser.

15. A method of mass spectrometry comprising:
obtaining a first signal output from an ion detector over a mass spectrum which is divided into n mass windows or memory locations, wherein n is more than one;
digitising the first signal output from the ion detector to produce a first digitised signal;
determining a second differential or second difference of said first digitised signal;
determining the mass or mass to charge ratio $m_1$ of one or more first ions from said second differential or second difference of said first digitised signal;
determining the intensity $I_1$ of said one or more first ions;
digitising a second signal output from said ion detector to produce a second digitised signal;
determining a second differential or second difference of said second digitised signal;
determining the mass or mass to charge ratio $m_2$ of one or more second ions from said second differential or second difference of said second digitised signal;
determining the intensity $I_2$ of said one or more second ions; and
determining whether the determined mass or mass to charge ratio $m_2$ of said one or more second ions falls within a mass window or pre-determined memory location, of the n mass windows or memory locations, within which the determined mass or mass to charge ratio $m_1$ of said one or more first ions falls, wherein if it is determined that the determined mass or mass to charge ratio $m_2$ of said one or more second ions falls within a mass window or pre-determined memory location within which the determined mass or mass to charge ratio $m_1$ of said one or more first ions falls, regardless of the difference between $m_1$ and $m_2$, then said method further comprises: (i) determining a weighted mathematical average mass or mass to charge ratio m' of said one or more first ions $m_1$ and said one or more second ions $m_2$; or (ii) determining the combined intensity I of said one or more first ions $I_1$ and said one or more second ions $I_2$; and
combining data from said first and second digitised signals to provide a histogram.

16. Apparatus comprising:
means arranged to obtain a first signal output from an ion detector over a mass spectrum divided into n mass windows or memor locations, wherein n is more than one;
means arranged to digitise the first signal output from the ion detector to produce a first digitised signal;
means arranged to determine a second differential or second difference of said first digitised signal;
means arranged to determine the mass or mass to charge ratio $m_1$ of one or more first ions from said second differential or second difference of said first digitised signal; means arranged to determine the intensity $I_1$ of said one or more first ions;
means arranged to digitise a second signal output from said ion detector to produce a second digitised signal;
means arranged to determine a second differential or second difference of said second digitised signal;
means arranged to determine the mass or mass to charge ratio $m_2$ of one or more second ions from said second differential or second difference of said second digitised signal; means arranged to determine the intensity $I_2$ of said one or more second ions; and
means arranged to determine whether the determined mass or mass to charge ratio $m_2$ of said one or more second ions falls within a mass window or pre-determined memory location, of the n mass windows or memory locations, within which the determined mass or mass to charge ratio $m_1$ of said one or more first ions falls, wherein if it is determined that the determined mass or mass to charge ratio $m_2$ of said one or more second ions falls within a mass window or pre-determined memory location within which the determined mass or mass to charge ratio $m_1$ of said one or more first ions falls, regardless of the difference between $m_1$ and $m_2$, then said apparatus further: (i) determines a weighted mathematical average mass or mass to charge ratio m' of said one or more first ions $m_1$ and said one or more second ions $m_2$; or (ii) determines the combined intensity I of said one or more first ions $I_1$ and said one or more second ions $I_2$; and combining data from said first and second digitised signals to provide a histogram.

17. A method of mass spectrometry comprising:

obtaining a first signal output from an ion detector over an acquisition time period which is divided into n time periods or time windows wherein n is more than one;

digitising the first signal output from the ion detector to produce a first digitised signal;

determining the arrival time $T_1$ of one or more first ions;

determining the intensity $I_1$ of said one or more first ions;

digitising a second signal output from said ion detector to produce a second digitised signal; determining the arrival time $T_2$ of one or more second ions;

determining the intensity $I_2$ of said one or more second ions; and determining whether the determined arrival time $T_2$ of said one or more second ions falls within a time period or time window, of the n time periods or time windows, within which the determined arrival time $T_1$ of said one or more first ions falls, wherein if it is determined that the determined arrival time $T_2$ of said one or more second ions falls within said time period or time window within which the determined arrival time $T_1$ of said one or more first ions falls, regardless of the difference between $T_1$ and $T_2$, then said method further comprises: (i) determining a weighted mathematical average arrival time T' of said one or more first ions $T_1$ and said one or more second ions $T_2$; or (ii) determining the combined intensity I' of said one or more first ions $I_1$ and said one or more second ions $I_2$; and combining data from said first and second digitised signals to provide a mass spectrum with peaks or to provide a histogram.

18. Apparatus comprising:

means arranged to obtain a first signal output from an ion detector over an acquisition time period divided into n time periods or time windows wherein n is more than one;

means arranged to digitise the first signal output from the ion detector to produce a first digitised signal;

means arranged to determine the arrival time $T_1$ of one or more first ions; means arranged to determine the intensity $I_1$ of said one or more first ions;

means arranged to digitise a second signal output from said ion detector to produce a second digitised signal;

means arranged to determine the arrival time $T_2$ of one or more second ions; means arranged to determine the intensity $I_2$ of said one or more second ions; and means arranged to determine whether the determined arrival time $T_2$ of said one or more second ions falls within a time period or time window, of the n time periods or time windows, within which the determined arrival time $T_1$ of said one or more first ions falls, wherein if it is determined that the determined arrival time $T_2$ of said one or more second ions falls within said time period or time window within which the determined arrival time $T_1$ of said one or more first ions falls, regardless of the difference between $T_1$ and $T_2$ said apparatus further: (i) determines a weighted mathematical average arrival time T' of said one or more first ions $T_1$ and said one or more second ions $T_2$; or (ii) determines the combined intensity I' of said one or more first ions $I_1$ and said one or more second ions $I_2$ and combines data from said first and second digtised siginals to provide a mass spectrum with peaks or provide a histogram.

19. A method of mass spectrometry comprising:

obtaining a first signal output from an ion detector over a mass spectrum which is divided into n mass windows or memory locations, wherein n is more than one;

digitising the first signal output from the ion detector to produce a first digitised signal;

determining the mass or mass to charge ratio $m_1$ of one or more first ions;

determining the intensity $I_1$ of said one or more first ions;

digitising a second signal output from said ion detector to produce a second digitised signal;

determining the mass or mass to charge ratio $m_2$ of one or more second ions; determining the intensity $I_2$ of said one or more second ions; and determining whether the determined mass or mass to charge ratio $m_2$ of said one or more second ions falls within a mass window or pre-determined memory location, of the n mass windows or memory locations, within which the determined mass or mass to charge ratio $m_1$ of said one or more first ions falls, wherein if it is determined that the determined mass or mass to charge ratio $m_2$ of said one or more second ions falls within a mass window or pre-determined memory location within which the determined mass or mass to charge ratio $m_1$ of said one or more first ions falls, regardless of the difference between $m_1$ and $m_2$, then said method further comprises: (i) determining a weighted mathematical average mass or mass to charge ratio m' of said one or more first ions $m_1$ and said one or more second ions $m_2$; or (ii) determining the combined intensity I of said one or more first ions $I_1$ and said one or more second ions $I_2$; and combining data from said first and second digitised signals to provide a histogram.

20. Apparatus comprising:

means arranged to obtain a first signal output from an ion detector over a mass spectrum divided into n mass windows or memory locations, wherein n is more than one;

means arranged to digitise the first signal output from the ion detector to produce a first digitised signal;

means arranged to determine the mass or mass to charge ratio $m_1$ of one or more first ions; means arranged to determine the intensity $I_1$ of said one or more first ions; means arranged to digitise a second signal output from said ion detector to produce a second digitised signal;

means arranged to determine the mass or mass to charge ratio $m_2$ of one or more second ions; means arranged to determine the intensity $I_2$ of said one or more second ions; and means arranged to determine whether the determined mass or mass to charge ratio $m_2$ of said one or more second ions falls within a mass window or pre-determined memory location, of the n mass windows or memory locations, within which the determined mass or mass to charge ratio $m_1$ of said one or more first ions falls, wherein if it is determined that the determined mass or mass to charge ratio $m_2$ of said one or more second ions falls within a mass window or pre-determined memory location within which the determined mass or mass to charge ratio $m_1$ of said one or more first ions falls, regardless of the difference between $m_1$ and $m_2$, then said apparatus further: (i) determines a weighted mathematical average mass or mass to charge ratio m' of said one or more first ions $m_1$ and said one or more second ions $m_2$; or (ii) determines the combined intensity I of said one or more first ions $I_1$ and said one or more second ions $I_2$; and combining data from said first and second digitised signals to provide a histogram.

21. A method as claimed in claim 1, wherein if it is determined that the determined arrival time $T_2$ of said one or more second ions falls within said time period or time window within which the determined arrival time $T_1$ of said one or more first ions falls then said method further comprises: (i) determining a weighted mathematical average arrival time T' of said one or more first ions $T_1$ and said one or more second ions $T_2$; and (ii) determining the combined intensity I' of said one or more first ions I1 and said one or more second ions I2.

22. A method as claimed in claim 1, wherein said time period or time window has a width, wherein the width falls within a range of 1 ps to 500 μs.

23. A method as claimed in claim 22, further comprising:

obtaining said first signal or said second signal over an acquisition time period of 1 μs to 1 ms; and subdividing said acquisition time period into 100-1,000,000 time periods or time windows at a sampling or acquisition rate of 1 GHz to 10 GHz.

24. A method as claimed in claim 11, further comprising:

determining a second differential or second difference of said continuum or mass spectrum;

determining an arrival time or mass to charge ratio of one or more ions, peaks or mass peaks from said second differential or second difference of said continuum or mass spectrum; and determining an intensity of peaks or mass peaks from said continuum time or mass spectrum.

* * * * *